(12) United States Patent
Ghetie et al.

(10) Patent No.: US 11,218,322 B2
(45) Date of Patent: Jan. 4, 2022

(54) SYSTEM AND METHOD FOR RECONFIGURING AND DEPLOYING SOFT STOCK-KEEPING UNITS

(71) Applicant: INTEL CORPORATION, Santa Clara, CA (US)

(72) Inventors: Sergiu D. Ghetie, Hillsboro, OR (US); Neeraj S. Upasani, Portland, OR (US); Chukwunenye S. Nnebe, Folsom, CA (US); Won Lee, Hillsboro, OR (US); Shaila R. Murty, Chandler, AZ (US); Arkadiusz Berent, Pomorskie (PL); Vasuki Chilukuri, Hillsboro, OR (US); David T. Mayo, Boxborough, MA (US); Scott P. Bobholz, Bolton, MA (US); Vinila Rose, Bangalore (IN); Wojciech S. Powiertowski, Beaverton, OR (US)

(73) Assignee: INTEL CORPORATION, Santa Clara, CA (US)

(*) Notice: Subject to any disclaimer, the term of this patent is extended or adjusted under 35 U.S.C. 154(b) by 949 days.

(21) Appl. No.: 15/719,375

(22) Filed: Sep. 28, 2017

(65) Prior Publication Data

US 2019/0097810 A1    Mar. 28, 2019

(51) Int. Cl.
| | |
|---|---|
| *H04L 29/06* | (2006.01) |
| *H04L 9/32* | (2006.01) |
| *H04L 9/14* | (2006.01) |
| *G06Q 10/08* | (2012.01) |
| *H04L 9/30* | (2006.01) |

(52) U.S. Cl.
CPC ......... *H04L 9/3247* (2013.01); *G06Q 10/087* (2013.01); *H04L 9/14* (2013.01); *H04L 9/30* (2013.01); *G06Q 2220/18* (2013.01); *H04L 2209/603* (2013.01); *H04L 2209/80* (2013.01)

(58) Field of Classification Search
CPC . H04L 9/00; H04L 9/3247; H04L 9/14; H04L 9/30; H04W 12/00; G06F 12/00; G06Q 10/087; G06Q 2220/18
See application file for complete search history.

(56) References Cited

U.S. PATENT DOCUMENTS

| | | | |
|---|---|---|---|
| 9,600,290 B2 * | 3/2017 | Inoue | ................... G06F 9/3885 |
| 9,712,437 B2 * | 7/2017 | Burgess | .............. H04L 43/0829 |
| 9,893,898 B2 * | 2/2018 | Kreft | ......................... H04L 9/30 |
| 10,771,448 B2 | 9/2020 | Kocher et al. | |

(Continued)

*Primary Examiner* — Joseph P Hirl
*Assistant Examiner* — Leynna Truvan
(74) *Attorney, Agent, or Firm* — Kacvinsky Daisak Bluni PLLC

(57) ABSTRACT

Techniques and apparatuses for issuance of license upgrades for hardware components in the field, as well as the hardware components, are described. In one embodiment, for example an apparatus may include processor circuitry and memory in communication with the processor circuitry, wherein the memory contains a configuration data block and license data block, the configuration data block being read from the memory via a licensing apparatus and the licensing data block being written to the memory by the licensing apparatus. The processor may include executable code to process the licensing data block to facilitate an upgrade of the capabilities of the processor circuitry.

20 Claims, 17 Drawing Sheets

(56) References Cited

U.S. PATENT DOCUMENTS

| | | | |
|---|---|---|---|
| 2015/0205614 A1* | 7/2015 | Lahteenmaki | G06F 9/505 |
| | | | 712/215 |
| 2015/0341229 A1* | 11/2015 | Richter | H04L 43/08 |
| | | | 709/224 |
| 2016/0217105 A1* | 7/2016 | Khatri | G06F 13/28 |
| 2017/0221017 A1* | 8/2017 | Gonen | G06Q 10/1097 |
| 2018/0027066 A1* | 1/2018 | Van De Groenendaal | |
| | | | G06F 13/385 |
| | | | 709/226 |
| 2018/0052712 A1* | 2/2018 | Power | G06F 9/5005 |

* cited by examiner

SYSTEM AND METHOD FOR RECONFIGURING AND DEPLOYING SOFT STOCK-KEEPING UNITS

TECHNICAL FIELD

Embodiments herein generally relate to digital rights enforcement, and, more particularly, field-upgradable hardware units.

BACKGROUND

A stock keeping unit (or "SKU") is an identification code for a product or service that is typically assigned by the manufacturer or service provider and helps track an item for inventory and invoicing purposes. The SKU is commonly portrayed as a machine-readable bar code, but may take any form. Each unique SKU typically represents a distinct type and configuration of an item for sale, but is not meant to identify particular units of stock.

DETAILED DESCRIPTION

Figure 1:
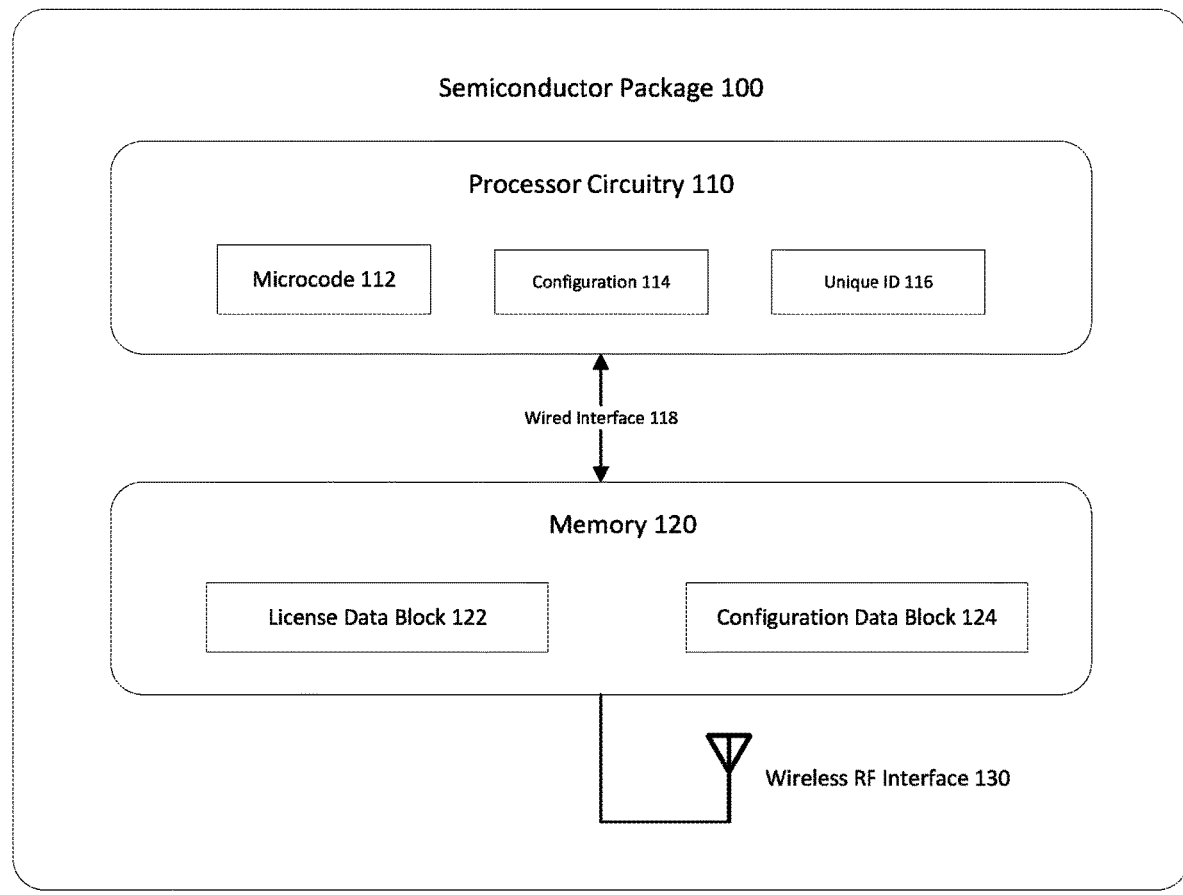
FIG. 1 illustrates an embodiment of a hardware component that is field upgradeable.

There are certain types of goods for which variations in the configuration can be applied after the product leaves the manufacturer. An example of one such product is the central processing unit ("CPU") of a computer. Various configuration options, for example, number of cores, cache size, number of computing threads, memory size, operating frequency, etc. can often be upgradeable in the field by an original equipment manufacturer (OEM), an original design manufacturer (ODM) or an end user. Furthermore, it is often more economical to manufacture the CPU with all available capabilities for the highest level of configuration and disable some capabilities to provide lower cost exemplars of the product. Thus, CPUs can be manufactured with all possible options and "fused" to a base configuration, typically the lowest level of configuration. Thereafter, a final configuration can be applied in the field by overriding the base configuration. The authorization to apply the override may be generated by a licensing appliance.

With many configuration options available, the number of possible SKUs could rise exponentially to cover all possible combinations of options. Furthermore, unless inventory can be manufactured to meet immediate demand, it is often necessary to stock many different combinations of options.

One possible strategy to solve this problem is to configure all manufactured items at the lowest possible configuration level (and thus at the lowest price point) and to allow all upgrades and reconfigurations to take place in the field, as needed. The configuration and SKU of the upgraded product is then updated based on licensing authorization generated by a licensing appliance, and the license for the upgraded capabilities of the reconfigured product is stored on non-volatile RAM associated with or built into the product. The customer can then be invoiced for the upgraded capabilities based on the issued licenses. This strategy of having field-upgradable hardware has the added advantage of allowing the stocking of a single base item, instead of items with every possible configuration.

Note that, as used herein, the term "license data block" means a data block conferring a right, permission, authorization, consent, sanction, approval, or endorsement to use certain features of the processor, or to upgrade the capabilities of the processor.

Various embodiments may be generally directed to apparatuses for issuing licenses for upgrades of hardware components in the field. The upgrade may be performed at the manufacturing facility, at an OEM or OED facility, or at the facility of an end user, via a licensing appliance. In some embodiments, the hardware component may be a microprocessor having associated memory. In some embodiments, the microprocessor and memory may be manufactured in a single semiconductor package, while in other embodiments, the microprocessor and memory may be manufactured in separate semiconductor packages and may communicate with each other via a wired interface.

In various embodiments, the microprocessor may be loaded with executable code that executes on a cold boot of the microprocessor. In some embodiments, the executable code will read a license data block from the memory and perform an upgrade of the capabilities of the microprocessor by overriding various fuse settings for the microprocessor.

In some embodiments, the executable code may be embodied as executable code or as a hardware block in the microprocessor, the hardware block comprising a dedicated piece of logic implemented within the microprocessor using logic gates in lieu of firmware. It should be understood by one of skill in the art that, as used herein, the terms executable code, microcode, and firmware are used interchangeably.

In various embodiments, the memory may be radio frequency (RF) capable, allowing portions of the memory to be written to and read from via a wireless connection. In such cases, the embodiment may further include an RF antenna. In some embodiments, the memory may be written to or read from without power being applied to the memory. In other embodiments, the memory may be read from or written to via the wired connection through the microprocessor.

In various embodiments, the microprocessor will be provided with a unique identification (ID) number. In some embodiments, the unique ID number may be stored in the executable code. In other embodiments, the unique ID may be stored in the memory. In yet other embodiments, the unique ID maybe stored in both the executable code and the memory.

In another aspect, a licensing apparatus may be provided. In various embodiments, the licensing apparatus may receive requests to upgrade a particular microprocessor. In some embodiments, the request may be received directly from a user interface generated by the licensing apparatus. In other embodiments, the request may be received from a user equipment via a wireless connection.

In various embodiments, the licensing apparatus may communicate with the memory associated with the microprocessor. In some embodiments, the memory may be read from or written to using a hardware programming interface. In some embodiments, the hardware programming interface communicates with the licensing apparatus via the user equipment. In other embodiments, the licensing apparatus communicates with the memory via a hardware test platform via a wired interface.

In various embodiments, the licensing apparatus write to and reads from the memory. In some embodiments, a configuration data block is read from the memory. The configuration data block may contain, in some embodiments, the unique ID of the microprocessor. In other embodiments, the licensing apparatus writes a licensing block to the memory containing authorization for the upgraded capabilities.

In various embodiments, data written to or read from the memory by the licensing apparatus may be digitally signed. In some embodiments, the licensing apparatus may include a hardware signing module, and the licensing data block may be digitally signed using an encryption process and private key unique to the licensing apparatus. In some embodiments, the configuration data block may be digitally signed, with the digital signature including the unique ID of the microprocessor. The fact that each licensing apparatus has its own private key allows for customer-specific CPU grouping. That is, only specific CPUs targeted for a specific customer who has possession of the corresponding licensing apparatus with a specific private key is able to generate a license for a specific CPU.

FIG. 1 illustrates an example of an embodiment that may be representative of various embodiments. Semiconductor package 100 includes processor circuitry 110. Processor circuitry 110 may be a typical microprocessor of any type. Processor circuitry 110 may include executable code 112 which may be executed on a cold boot of the processor circuitry 110 or via any other means. Processor circuitry 110 may also include a configuration 114 which may be established at the point of manufacture. Configuration 114 may be "hard wired" and upgradeable by overriding various "fused" settings in processor circuitry 110. Processor circuitry 110 may also include a unique ID 116 which is capable of uniquely identifying the semiconductor package 100.

Semiconductor package 100 may also include memory 120 in communication with processor circuitry 110 via wired interface 118. In one embodiment, memory 120 may be non-volatile random access memory (NVRAM). In another embodiment, memory 120 may be able to be read from and written to via an RF interface, and is referred to as RF-NVRAM. In such embodiments, semiconductor package 100 may include wireless RF interface 130, for example, an RF antenna, which may be external to or integrated with semiconductor package 100. In some embodiments, memory 120 may be able to be written to or read from without power being applied to the semiconductor package 100.

Figure 2:
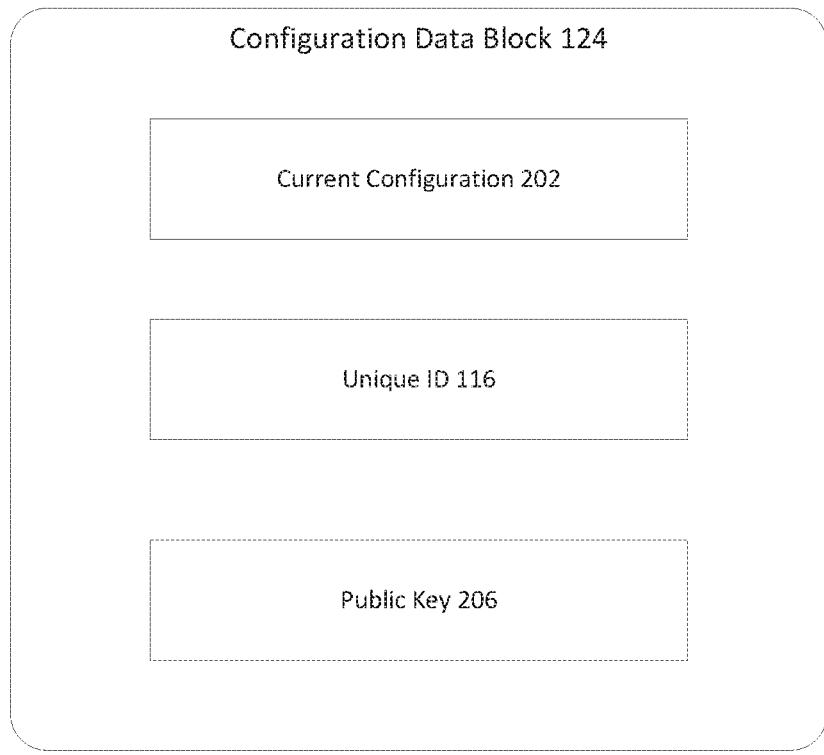
FIG. 2 illustrates a block diagram of a portion of the contents of the memory of the embodiment of FIG. 1

FIG. 2 illustrates a block diagram of a portion of the contents of the memory of the embodiment. As shown in FIG. 2, memory 120 may comprise a portion containing configuration data, referred to as configuration data block 124. Configuration data block 124, in some embodiments, may contain the unique identifier (ID) 116 of the processor circuitry 110. In some embodiments, configuration data block 124 may contain information indicating the current configuration 202 of processor circuitry 110. In yet other embodiments, configuration data block 124 may contain a public encryption key 206.

Note that, as used herein, the term "unique identifier" is meant to refer to an identifier which is capable of uniquely identifying a particular processor, for example, a serial number. However, the processors could have, instead of or in addition to the unique identifier, identifiers which associate it with a particular type of processor, a family of processors, or any other way of grouping processors, for example, all processes assigned to particular OEM.

In general, the configuration data block 124 may store configuration data for one or more elements of the semiconductor package 100, such as the processor circuitry 110, for example. Configuration data may comprise data uniquely identifying the processor circuitry 110, memory 120, or both the processor circuitry and memory. Examples of configuration data may comprise without limitation a serial number assigned by the manufacturer at manufacturing time. Other data useful in the process described herein may also be contained in the configuration data block 124. In one embodiment, for example, the configuration data may comprise data representing the current configuration of the processor circuitry 124 and other embodiments the configuration data may comprise for example a public encryption key associated with the semiconductor package. Embodiments are not limited to these examples.

In various embodiments, the configuration data block 124 may store a unique ID 116 of the processor circuitry 110. A unique ID 116 may comprise a serial number assigned by the manufacturer which uniquely identifies processor circuitry 124. Examples of a unique ID 116 may comprise, without limitation, strings of ASCII characters, encryption keys, or random numbers. In one embodiment, for example, the unique ID 116 may comprise a string of ASCII characters hardcoded into processor circuitry 110. Embodiments are not limited to these examples.

In various embodiments, the configuration data block 124 may store a public key 206 of the processor circuitry 110. A public key 206 may comprise the public portion of a private/public key asymmetrical cryptographic system. For example, public key 206 may comprise, without limitation, the public portion of an elliptic curve digital signature algorithm (ECDSA). In one embodiment, for example, the unique ID 116 may comprise a 256 byte string of characters. Embodiments are not limited to these examples.

Figure 3:
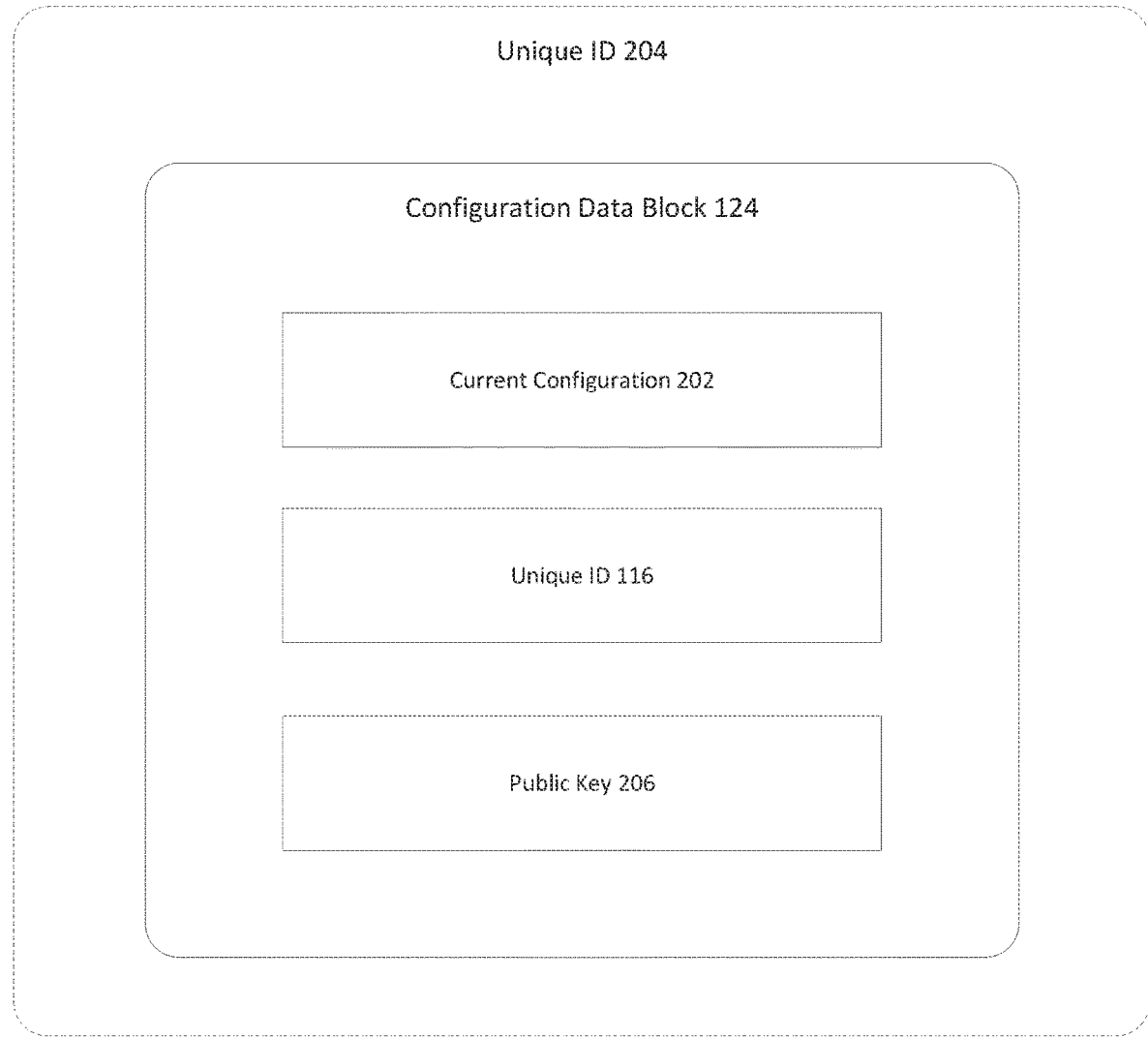
FIG. 3 illustrates a digitally-signed version of the memory contents of FIG. 2.

FIG. 3 illustrates a digitally-signed version of the memory contents of memory 120. In various embodiments, configuration data block 124, as shown in FIG. 3 may be digitally signed or encrypted using the unique ID 204 of processor circuitry 110. The digital signature may comprise a private/public key asymmetrical cryptographic system. In one embodiment for example the digital signature may comprise a signature generated by the elliptical curve digital signature algorithm (ECDSA), however, any well-known private/public key encryption system may be utilized.

Memory 120 may also contain a portion containing license data, referred to as the license data block 122. A license data block 122 may comprise information regarding specific upgrades to processor circuitry 110 as well as authorizations for those upgrades. In one embodiment, for example the license data block 122 may comprise data which may be processed by executable code 112 stored in processor circuitry 110 to affect the upgrade. License data block 122 may hold data indicating that processor circuitry 110 may be configured differently than the configuration indicated in configuration data block 124. In some cases, the different configuration will represent an upgrade to the current configuration of processor circuitry 110. In some embodiments, the license data block 122 may indicate that processor circuitry 110 may be upgraded by overriding certain parameters in the current configuration to provide a performance enhancement. Parameters may include, for example, the number of cores, the cache size, the number of computing threads, the memory size, the operating frequency, etc., however, this is not meant to be a comprehensive listing of the parameters that may be overridden. In some embodiments, the license data block 122 may be digitally signed or encrypted using a private key. In some embodiments, the license data block 122 may comprise data generated by the manufacturer or by a licensing appliance to specify and authorize upgrades to processor circuitry 110. In some embodiments, the license data block may contain manufacturer-specific data specifying and authorizing the upgrade of processor circuitry 110.

In various embodiments, the configuration data block 124 and the license data block 122 may be read from or written to via wireless RF interface 130 or via wired interface 118 through processor circuitry 110.

Figure 4:
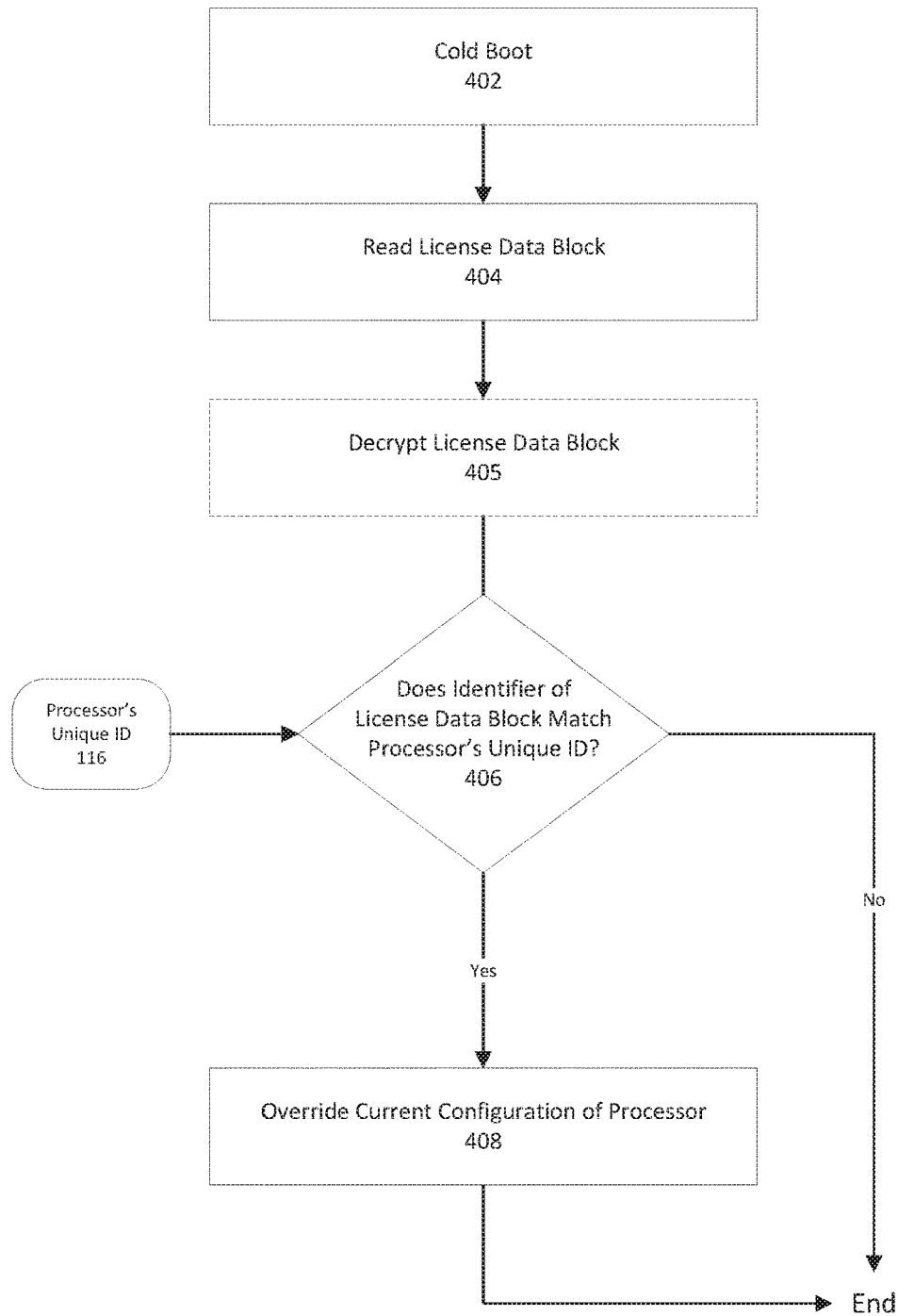
FIG. 4 illustrates an embodiment of a first logic flow.

FIG. 4 illustrates an embodiment of the logic flow 400 for upgrading the operational capabilities of processor circuitry 110. Logic flow 400 may be representative of some or all of the operations executed by one or more embodiments described herein. In one embodiment, executable code 112 is stored in and executed from processor circuitry 110. In other embodiments, executable code 112 may be stored in memory 120. The logic flow, in other embodiments, may be implemented in software, firmware, hardware, or any combination thereof. In software and firmware embodiments, a logic flow may be implemented by computer executable instructions stored on a non-transitory computer readable medium or machine readable medium, such as an optical, magnetic or semiconductor storage. The embodiments are not limited in this context.

In the illustrated embodiment shown in FIG. 4, the logic flow 400 at block 402 begins on a cold boot of processor circuitry 110. In other embodiments, the executable code may be executed by any known means of beginning a logic flow. At block 404 the executable code 124 is configured to read the license data block 122 from memory 120 in semiconductor package 100 via wired interface 118 between memory 120 and processor circuitry 110. In certain embodiments, the license data block 122 may be encrypted. At block 405, the executable code is configured to decrypt the license data block 122. License data block 122 may have been encrypted using a private key, and may be decrypted using public key 206, although any known method of encrypting and decrypting blocks of data may be used. In certain embodiments, the license data block 122 will have been created specifically for the microprocessor 110 identified by unique ID 116. As such, license data block 122 will contain an identification number identifying a particular processor for which the license data block 122 is intended.

At block 406, the unique ID contained in license data block 122 will be compared with the processor's unique ID 116. If there is no match logic flow 400 will end without performing the override of configuration 114 of processor circuitry 110. If there is a match between the identification number in license data block 122 and the processor's unique ID 116 executable code 112 will override the configuration 114 of processor circuitry 110 with the capabilities reflected in the license data block 122.

Figure 5:
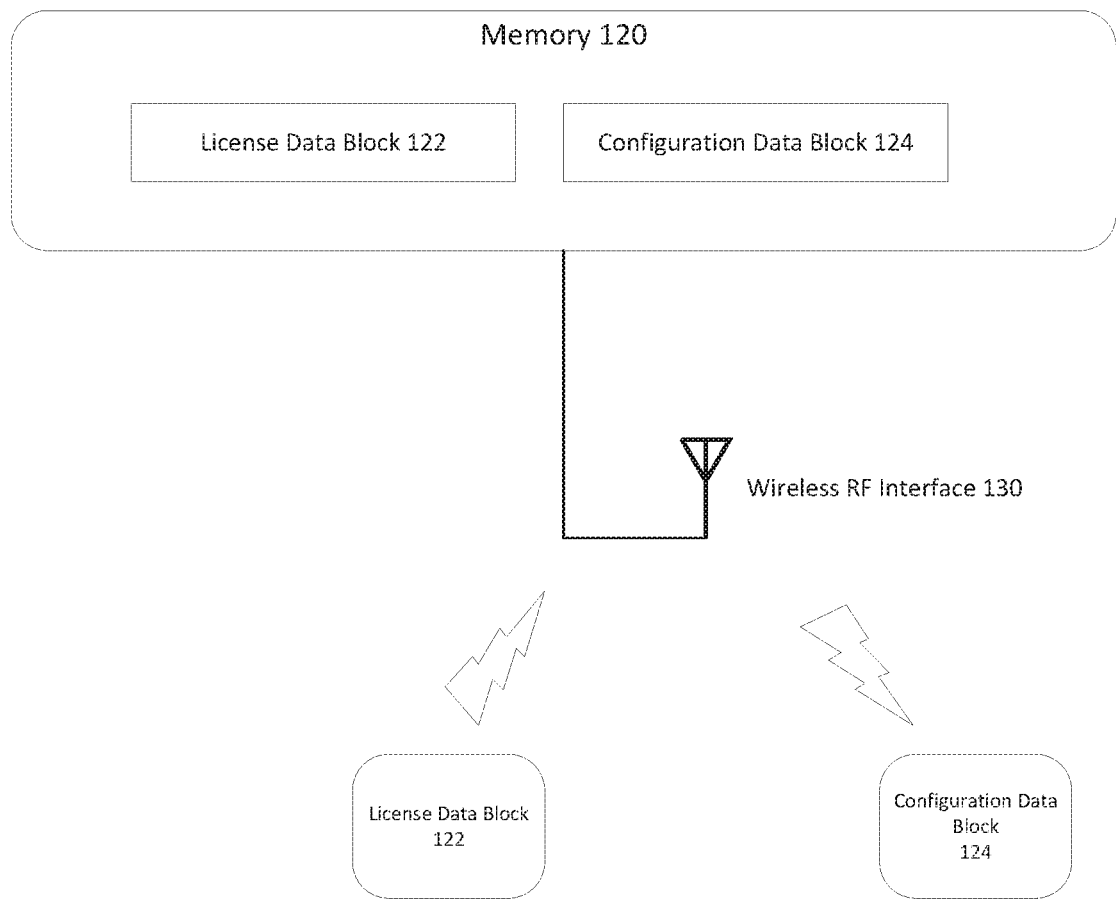
FIG. 5 illustrates the exchange of memory contents for the embodiment of FIG. 5

FIG. 5 and shows an embodiment wherein memory 120 is RF enabled (RF-NVRAM), and for which memory 120 can be read from and written to via wireless RF interface 130. FIG. 5 shows configuration data block 124 being read from memory 120 via wireless RF interface 130, and license data block 122 being written to memory 120 via wireless RF interface 130.

In various embodiments RF-enabled memory 120 may be read from or written to with any other device capable of communicating over a wireless RF interface. In some embodiments, the wireless RF interface may comprise for example a wireless RF interface on a mobile device or on a licensing appliance. In other embodiments, the wireless RF interface may be part of a special programming tool, discussed later, which may be specially configured to communicate with RF-enabled memory 120. In certain embodiments, the RF-enabled memory 120 may be read from and written to via the wireless RF interface when not connected to a power source. In such embodiments, the power for reading from and writing to the RF-enabled memory 120 is derived from the wireless RF interface. In yet other embodiments the RF-enabled memory 120 may be read from and written to when power is connected to semiconductor package 100.

In other embodiments, memory 120 may not be RF-enabled. In such cases memory 120 may be written directly via a wired connection 118 through processor circuitry 110. In some embodiments, processor circuitry 110 may be connected via a wired connection to another component which wishes to read from or write to memory 120. In some embodiments, the component may be a licensing appliance. In some embodiments, the wired connection made comprise a wired connection through a hardware test platform at a manufacturing, OEM, or OED facility.

Figure 6:
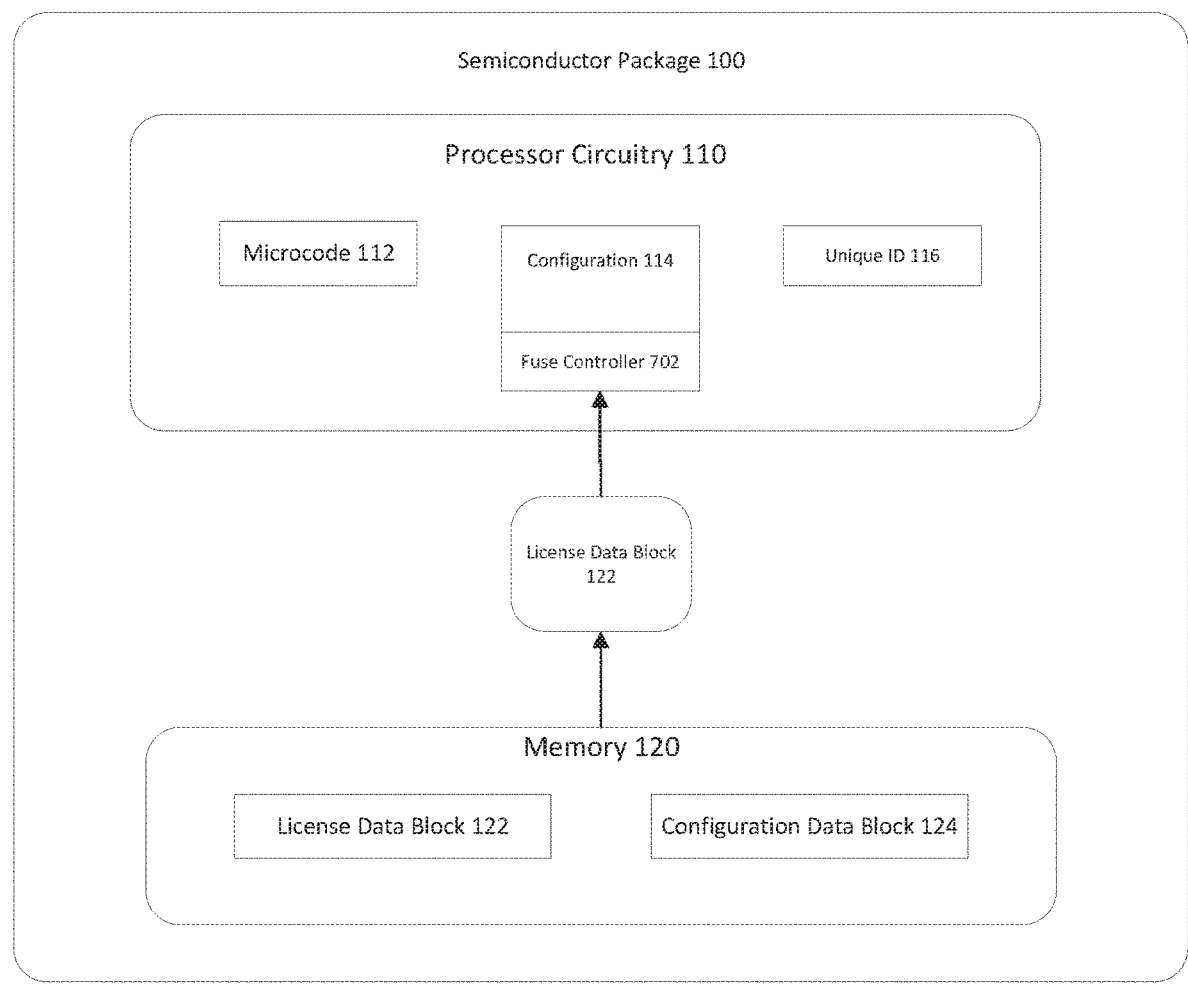
FIG. 6 illustrates the embodiment of FIG. 1 showing data flow.

FIG. 6 shows semiconductor package 100 in more detail. In certain embodiments processor circuitry 110 will be configured with fuse controller 702, which contains the base configuration of processor circuitry 110. In some embodiments, the base configuration will be applied during the manufacturing process. In other embodiments the configuration may be applied during other processes. In some embodiments, processor circuitry 110 may be configured at the lowest capability level, but, in other embodiments the base configuration 114 can reflect any level of capability.

Configuration 114 is, in some embodiments, controlled by fuse controller 702, shown in FIG. 6, which enables a hardwiring of base configuration 114. In other embodiments, processor circuitry 110 will be hardwired to a base configuration via other means. License data block 122 contains specifications and authorizations necessary to override configuration 114 contained in fuse controller 702. Executable code 112 which, in some embodiments, will be contained in processor circuitry 110 and, in other embodiments, may be contained in memory 120, is responsible for reading the license data block 122 from memory 120 and applying the upgrades by overriding the base configuration in fuse controller 702. In some embodiments license data block 122 may comprise an encrypted data block, and may be decrypted by an algorithm encoded in executable code 112. In some embodiments, public key 206 may be used by executable code 112 to decrypt license data block 122.

Figure 7:
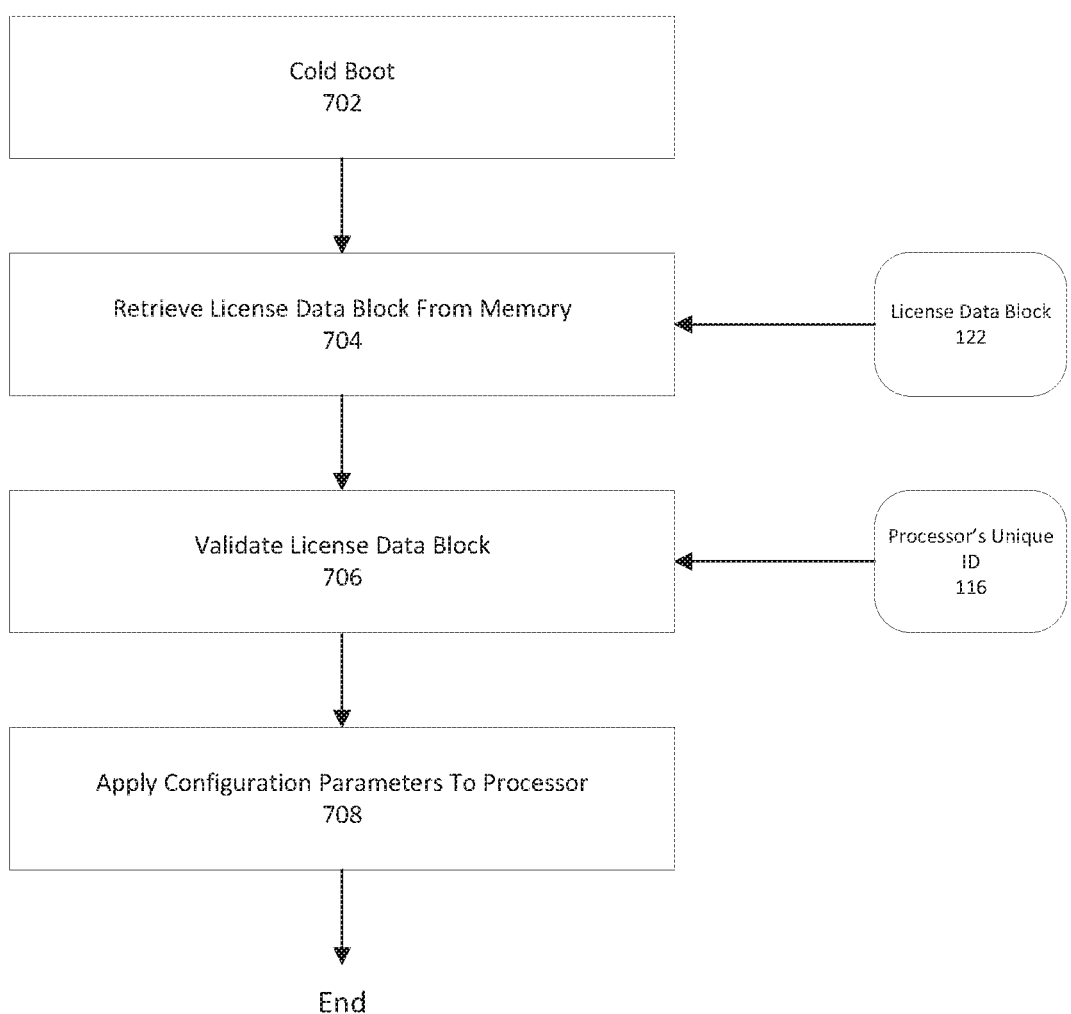
FIG. 7 illustrates an embodiment of a second logic flow.

FIG. 7 shows logic flow 700 of a method utilized by a hardware component 1050 for upgrading the configuration of processor circuitry 110. At block 702 the method is started, in one embodiment, via a cold boot of the hardware component. Hardware component 1050, in one embodiment, will be semiconductor package 100 with processor circuitry 110, but, in other embodiments, may be other types of hardware. At block 704, license data block 122 is retrieved from memory 120. In some embodiments, the license data block 122 may be validated at block 706. In some embodiments license data block 122 may be encrypted and the validation step may include a decrypting process. In other embodiments, license data block 122 may be digitally signed, and the digital signature verified. In some embodiments, license data block 122 will contain an identification number. In such cases, a further validation may be performed on the license data block 122 by comparing the identification number contained in license data block 122 with the processor's unique ID 116 and verifying a match therebetween. At block 708, if license data block 122 is validated the method is configured to apply the configuration parameters specified in license data block 122 to processor circuitry 110 to affect the upgrade of the capabilities of processor circuitry 110.

Figure 8:
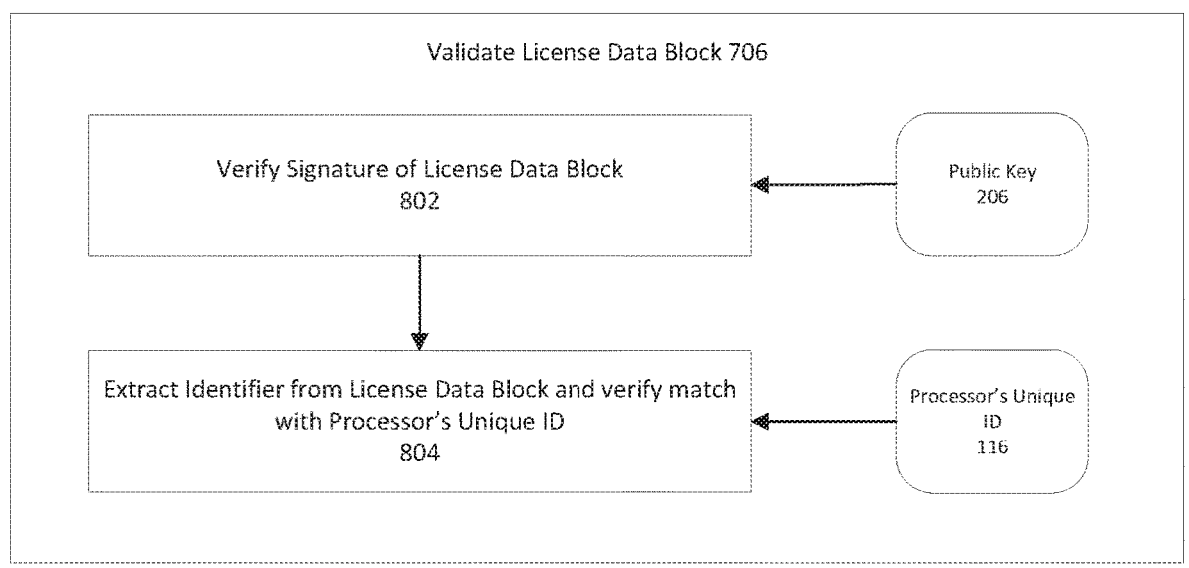
FIG. 8 illustrates an embodiment of a third logic flow.

FIG. 8 shows validation block 706 of FIG. 7 in more detail. In some embodiments, license data block 122 will be encrypted with a private key and, at block 802, may be decrypted using public key 206, although any known method of encryption and decryption may be used. In some embodiments license data block 122 may be digitally signed using the elliptical curve digital signature algorithm. In other embodiments license data block 122 may be unencrypted. At block 804, the identification number contained in license data block 122 is extracted and compared with the processor's unique ID 116 to confirm a match. In some embodiments, licensed authorizations for upgrades to processor circuitry 110 are specific to the processor identified by the processor's unique ID 116.

In some embodiments attempts to upgrade processor circuitry 110 with licenses not containing the processor's unique ID 116 will fail. In some embodiments, specific licensing appliances will be provided with a private key can be used to encrypt license data block 122 only for processors which have been manufactured containing a particular public key 126 which has been paired with the private key. This allows certain facilities, for example an OEM having a licensing appliance, to authorize upgrades only for semiconductor packages 100 which have been sold to that particular OEM, and not to semiconductor packages 100 which have been sold to other entities.

Figure 9:
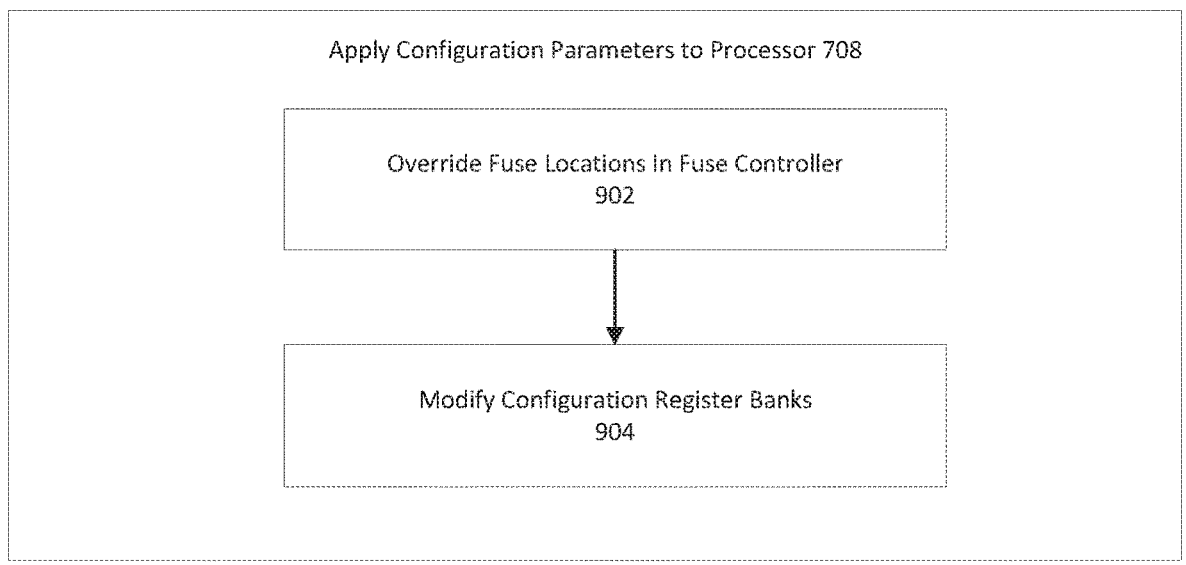
FIG. 9 illustrates an embodiment of a fourth logic flow.

FIG. 9 shows block 708 of FIG. 7 in more detail. In some embodiments, where the hardware component 1050 that is being upgraded is processor circuitry 110, a base configuration may be indicated by fuse locations in a fuse controller 702, as shown in FIG. 6. The upgrade process, which in some embodiments occurs at cold boot, overrides the fuse locations in fuse controller 702 with the new configuration indicated in license data block 122. In some cases, it may also be necessary to modify configuration registered banks in processor circuitry 110.

In some embodiments, other manufacturer-specific methods of applying the upgrades may be utilized without departing from the intended scope. The specific method of applying the upgrade may be embodied in executable code 112, but may be applied in other ways known to those of skill in the art. The embodiments are not meant to be limited by specific methods of applying the upgrade, but is meant to encompass methods which may be specific to types of hardware components other than those described herein.

Figure 10:
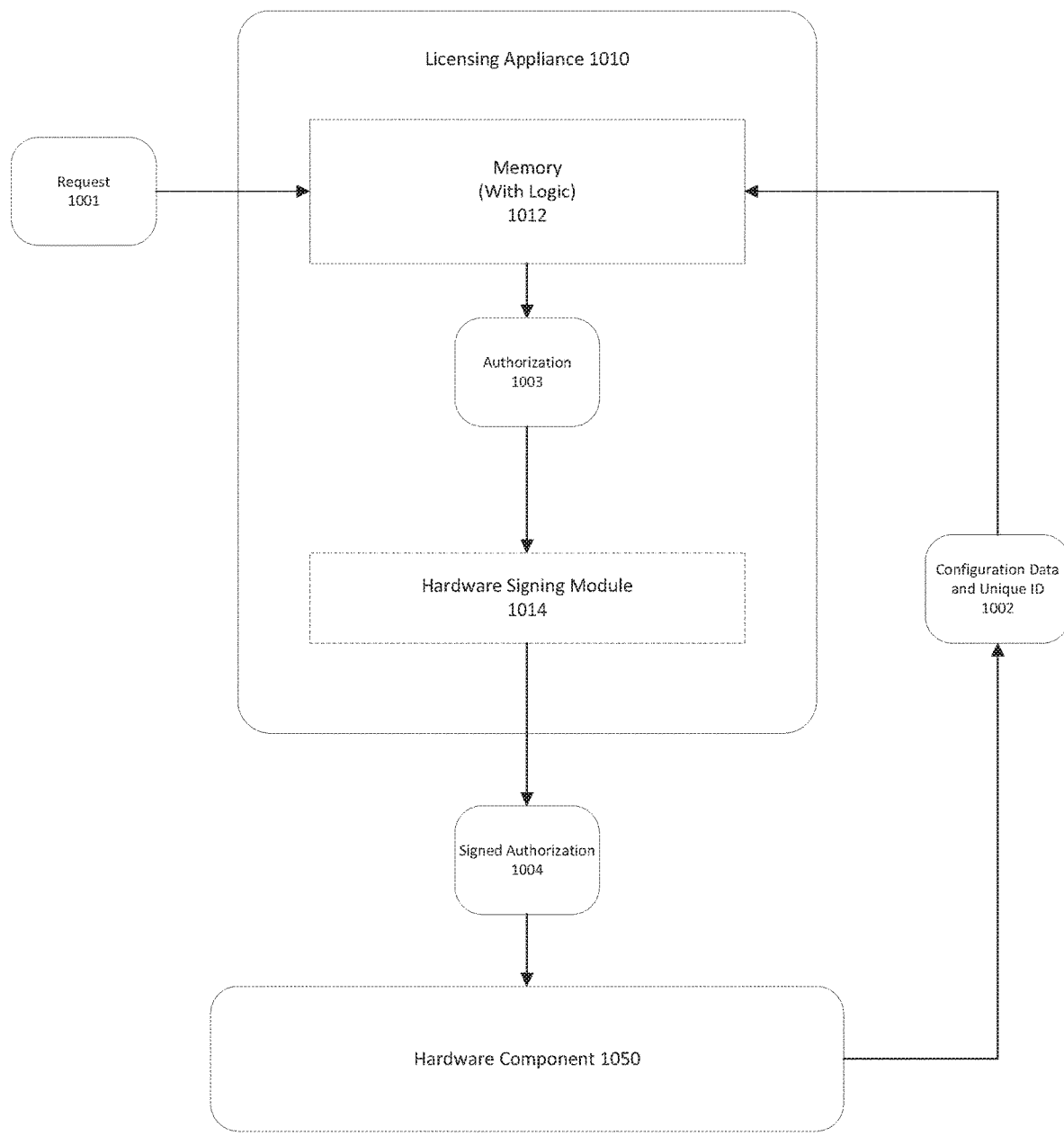
FIG. 10 illustrates a first embodiment of a licensing apparatus.

FIG. 10 shows licensing apparatus 1000, in block form. Licensing apparatus 1000 represents another aspect. Licensing appliance 1010 may, in some embodiments, comprise a memory configured with logic 1012. Logic 1012 may be configured to execute on a processor. In some embodiments, logic 1012 is configured to accept requests 1001 for upgrades to hardware component 1050. Request 1001 may be generated via any method known to one of skill in the art. In specific embodiments request 1001 may be generated via a user interface, while in other embodiments request 1001 may be accepted via other methods for example via email, via an application programming interface, or from another device having a user interface Licensing appliance 1010 may be configured to issue license authorizations 1003 in response to request 1001. In various embodiments, logic 1012 may request or read data from hardware component 1050. In some embodiments data requested from hardware component 1050 may identify hardware component 1050. In specific embodiments, logic 1012 will read configuration data and a unique ID 1002 from a hardware component 1050. In some embodiments, hardware component 1050 may be semiconductor package 100 shown in FIG. 1. In some embodiments, configuration data and a unique ID 1002 specific to hardware component 1050 may be contained in configuration data block 124, shown in FIG. 2. Logic 1012 may be configured to issue authorization 1003 for the specific hardware component 1050 identified by the unique ID 116 contained in the configuration data and unique ID 1002.

Configuration data and unique ID 1002 may be read in various ways from hardware component 1050. In certain embodiments configuration and unique ID 1002 will be read via a wireless RF interface 130 as shown in FIG. 5. In specific embodiments configuration data and unique ID made may be relayed to licensing appliance 1010 via an intermediate hardware component, for example a programming tool or a mobile device having a user interface through which request 1001 has been accepted. In other specific embodiments configuration data and unique ID may be read via a wired interface from hardware component 1050. In in specific embodiments the wired interface may comprise a hardware test platform containing a wired interface to hardware component 1050

In certain embodiments, once authorization 1003 is generated, it may be digitally signed by hardware signing module 1014. Hardware signing module 1014 may in certain embodiments comprise a standard commercially available PCIE-based hardware module for performing secure cryptographic operations. The hardware signing module may support a standard cryptographic algorithm for use in signing. In certain embodiments, the hardware signing module may contain a standard elliptical curve digital signature algorithm (ECDSA), which may in some embodiments, require a 256 byte key for signature generation and signature verification of the authorization 1003. In various embodiments, a private key, also contained in the hardware signing module 1014 is used to generate the signature or to encrypt authorization 1003. In other embodiments, any well-known method of encrypting the authorization 103 may be used. In yet other embodiments authorization 1003 may be left unencrypted.

Referring to FIG. 10, signed authorization 1004 is sent to hardware component 1050 for verification and use in upgrading the capabilities of hardware component 1050. In certain embodiments signed authorization 1004 may be license data block 122.

Figure 11:
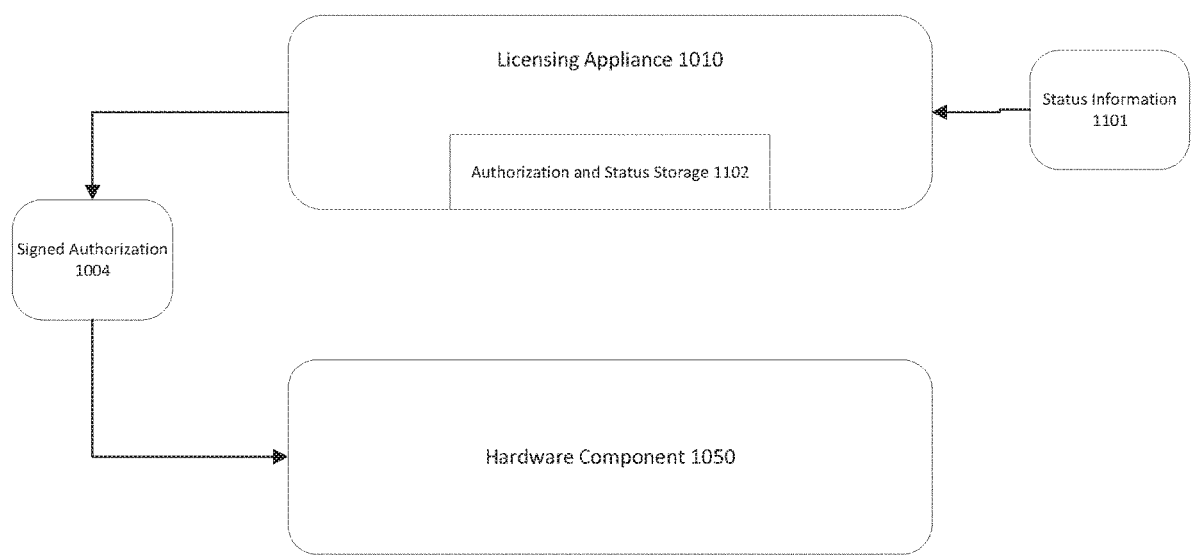
FIG. 11 illustrates an embodiment showing data flow between the hardware component and the licensing apparatus.

FIG. 11 shows licensing appliance 1010 having storage 1102 for the storing of authorizations 1003 which have been generated for various hardware components 1050. In some embodiments, once signed authorization 1004 has been successfully stored in the memory 120 of hardware component 1050, status information 1101 may be sent to licensing appliance 1010. In some embodiments status information 1101 is also stored in storage 1102. In some embodiments signed authorization 1004 may be stored in memory 120 contained in hardware component 1050, and may be accessed only upon a cold boot of hardware component 1050.

In some embodiments authorizations and statuses stored in authorization and status storage 1102 may be communicated off-site to another entity. In some embodiments, the other entity may be the manufacturer of hardware component 1050. In other embodiments, the other entity receiving information regarding the authorizations and statuses may be the entity authorizing the use of licensing appliance 1010. In some embodiments, the entity authorizing the use of licensing appliance 1010 and the manufacturer of hardware component 1050 may be one in the same. In specific embodiments, the authorizations and statuses in stored in authorization status storage 1102 may be communicated to the other entity via the Internet. In other embodiments the authorizations and statuses stored in authorization and status storage 1102, may be communicated to the other entity via any well-known method of communication, including for example, email, a direct TCP/IP connection between the licensing appliance 1010 and the other entity, and/or any other well-known method of communicating between two systems known to those of skill in the art.

Figure 12:
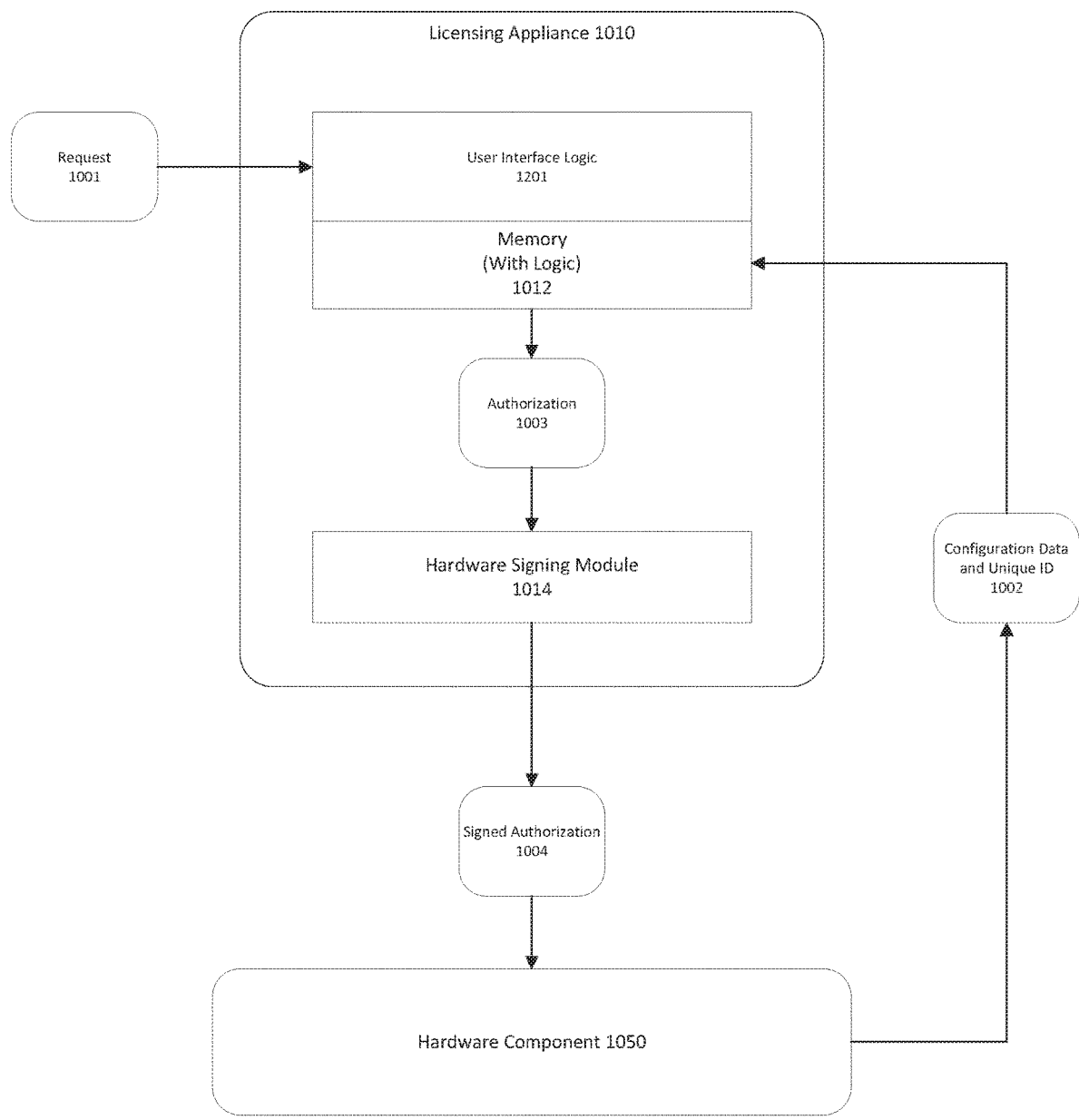
FIG. 12 illustrates a second embodiment of a licensing apparatus.

FIG. 12 shows another embodiment of licensing apparatus 1000 in which licensing appliance 1010 also is configured with user interface logic 1201, configured to generate a user interface for accepting requests 1001 directly from users. In all other respects licensing appliance 1010 as shown in FIG. 12 is identical to the embodiment of licensing appliance 1010 shown in FIG. 10.

Figure 13:
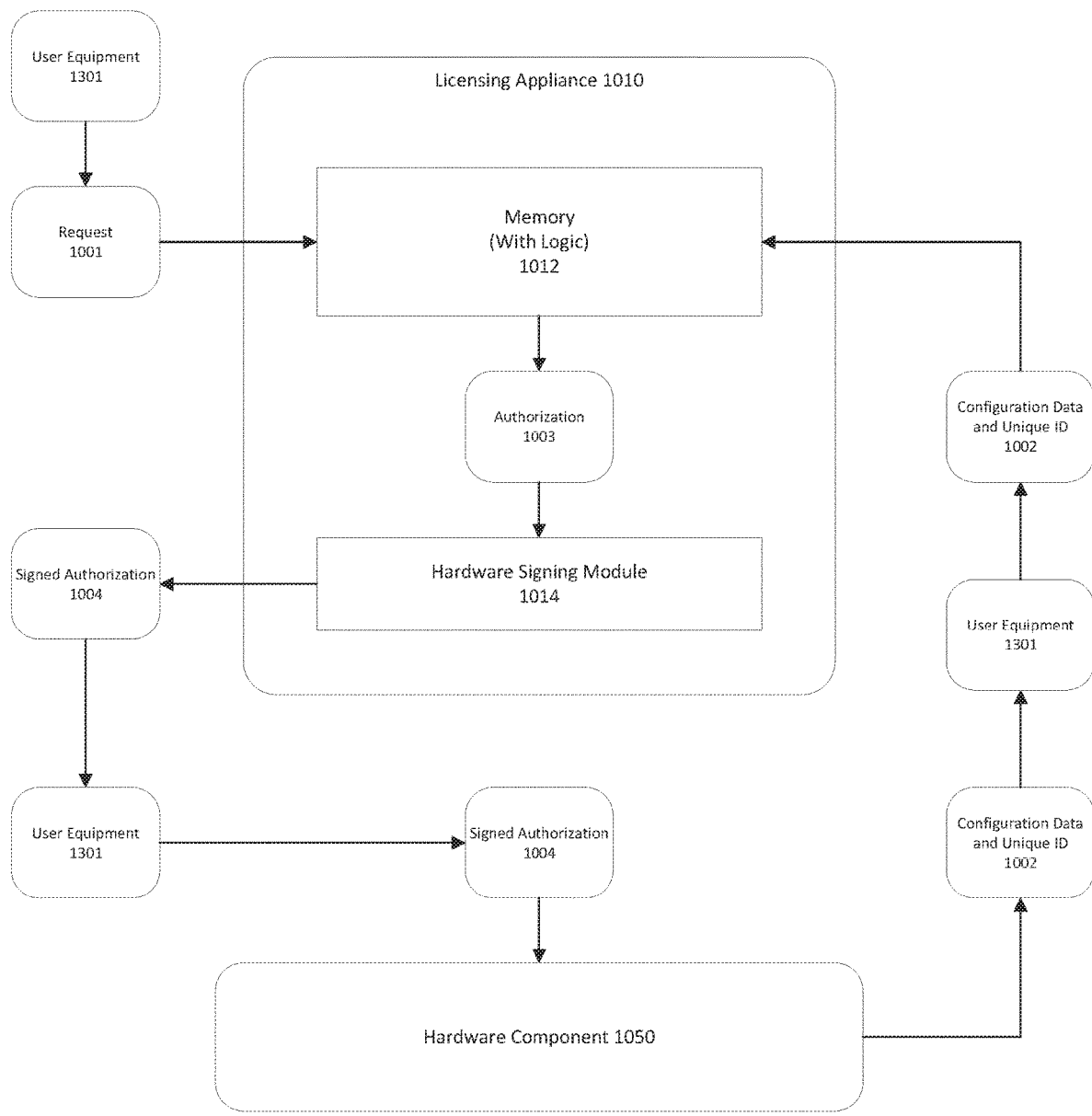
FIG. 13 illustrates a third embodiment of a licensing apparatus.

The user interface generated by user interface logic 1201 may be displayed on a local display comprising a visual and a user input device, for example a keyboard and/or mouse connected to licensing appliance 1010. In other embodiments, the user interface generated by user interface logic 1201 may be displayed via a remote display accessed over a network. For example, user interface logic 1201 may comprise generating a website accessible over the Internet. In yet other embodiments, user interface logic 1201 may communicate with an app installed on a user equipment, for example, a mobile computing device, to display the user interface. The embodiments are not meant to be limited by the method used to display the user interface but is meant to encompass any method known to those of skill in the art FIG. 13 shows yet another embodiment of licensing appliance 1010 in which requests 1001 are received through a user equipment 1301 which may be, for example, a smart phone, a tablet, or any other well-known mobile computing device. In one embodiment, the user interface is generated by user equipment 1301, and the particulars of the request 1001 are communicated to the licensing appliance 1010. In some embodiments, request 1001 is transmitted to licensing appliance 1010 from user equipment 1301 via a wireless connection, for example, Wi-Fi, Bluetooth, or near field communications (NFC), or is communicated over the Internet.

In the embodiment of FIG. 13, the communication of signed authorization 1004 to the hardware component 1050 may comprise relaying of signed authorization 1004 by the user equipment 1301. In certain embodiments, user equipment 1301 will have a user interface for accepting requests from users for the generation of signed authorization 1004. User equipment 1301 may write signed authorization 1004 into memory 120. Hardware component 1050 may further comprise a wireless interface, for example, RF interface 130 as shown in FIG. 1, or some other form of wireless communication, for example, Bluetooth, Wi-Fi or NFC. In some embodiments user equipment 1301 may communicate with hardware component 1050 via an intermediate device comprising, for example, a specialized programming tool. In some embodiments, user equipment 1301 may communicate with the programming tool via any well-known method of communication, for example, a wired connection, a wireless connection, for example, Bluetooth Wi-Fi or NFC. In some embodiments, the programming tool may communicate with hardware component 1050 via any well-known wired or wireless method of communication.

Further with respect FIG. 13, configuration data and unique ID 1002 may be relayed to licensing appliance 1010 via a user equipment 1301. User equipment 1301 may read the configuration data and unique ID 1002 from memory 120 of hardware component 1050. In some embodiments, configuration data and unique interface 1002 may be configuration data block 124. Hardware component 1050 may further comprise a wireless interface, for example, RF interface 130 as shown in FIG. 1, or some other form of wireless communication, for example, Bluetooth, Wi-Fi or NFC. In some embodiments user equipment 1301 may communicate with hardware component 1050 via an intermediate device comprising, for example, a specialized programming tool, previously discussed. The specialized programming tool may be specially configured to read from and write to memory 120 of hardware component 1050, via a wired or wireless interface as discussed above. In addition, the programming tool may be configured to communicate with the user equipment 1301 via a wired or wireless interface.

Figure 14:
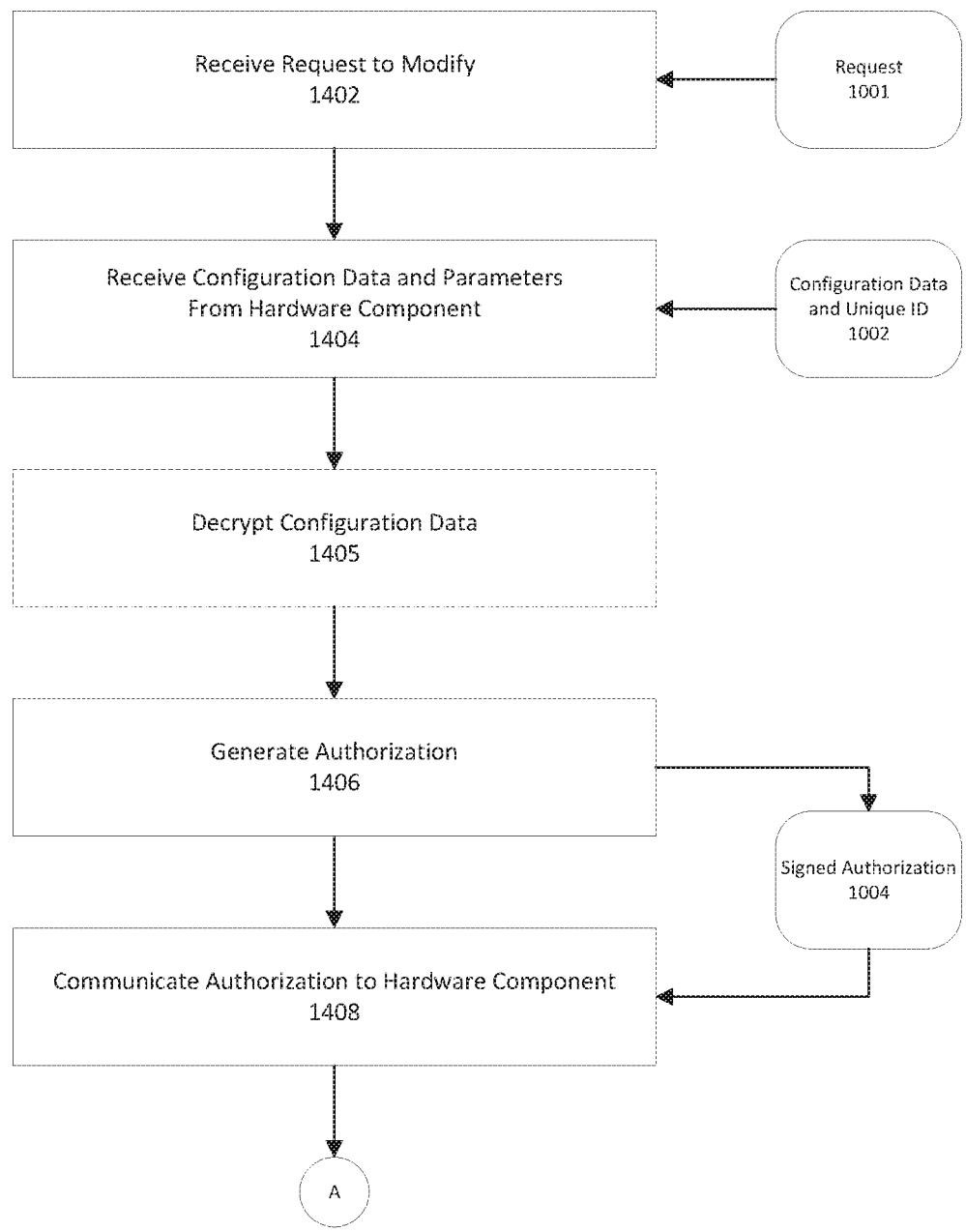
FIG. 14 illustrates an embodiment of fifth logic flow.

FIG. 14 shows logic flow 1400 of logic 1012 of licensing appliance 1010. At block 1402, the logic flow 1400 is receiving a request to modify one or more configuration parameters of a hardware component. For example, logic flow 1400 receives request 1001 to modify the configuration of hardware component 1050. In some embodiments, request 1001 is received via a user interface generated by user interface logic 1201 while, in other embodiments, request 1001 is received via a wireless interface from a user equipment 1301, as previously explained. In alternative embodiments request 1001 may be received in any manner, such as via email, or via wireless technology such as Bluetooth or NFC, or via a webpage accessed over the Internet. However, the logic is not meant to be limited by these embodiments.

In box 1404, logic flow 1400 is receiving configuration data indicating the current configuration parameters of hardware component 1050 and a unique ID 116 identifying the hardware component 1050. In some embodiments, the configuration data may also include a public encryption key paired with a private encryption key known only to licensing appliance 1010. For example, logic flow 1400 receives the configuration data and a unique ID 1002 from hardware component 1050. Configuration data and unique ID 1002 may, in some embodiments, be in the form of configuration data block 124. In various embodiments, configuration data and unique ID 1002 may be digitally signed or encrypted via any one of a number of well-known methods for encrypting data. In one embodiment, where hardware component 1050 is semiconductor package 100 shown in FIG. 1. In some embodiments, the configuration data and unique ID 1002 may be digitally signed using the unique identifier 116 of processor circuitry 110.

In box 1405, logic flow 1400 is optionally decrypting the configuration data and unique ID 1002 prior to generating the authorization. Configuration data and unique ID 1002 may be encrypted via any well-known method of encryption. In specific embodiments configuration data and unique ID is configured with a public/private key encryption scheme in which the configuration data and unique ID 1002 is encrypted with the public key 206 paired with a private key held by licensing appliance 1010. In some embodiments, the private key held by licensing appliance 1010 may be encoded into hardware signing module 1014, and retrieved therefrom when needed to decrypt the configuration data and unique ID 1002.

In box 1406, logic flow 1400 is generating an authorization to modify one or more of the configuration parameters. In some embodiments, the authorization contains the unique identifier of hardware component 1050, and the authorization. In some embodiments, the authorization will be digitally signed using an encryption method and private key of hardware signing module 1014. In other embodiments, the authorization may be signed using any well-known method of digitally signing or encrypting data. In some embodiments, signed authorization 1004 is embodied as license data block 122 shown in FIG. 1. In other embodiments signed authorization 1004 may be any form of data block, encrypted or unencrypted.

In box 1408 of logic flow 1400 is communicating the signed authorization 104 to hardware component 1050. In some embodiments, hardware component 1050 may have a wired connection to licensing appliance 1010 and a signed authorization 1004 may be communicated via the wired connection. In other embodiments, the signed authorization 1004 may be communicated to the hardware component 1050 via a wireless connection through a user equipment 1301. In still other embodiments, the user equipment 1301 may relay the signed authorization 1004 through a specialized programming tool, as previously discussed.

Figure 15:
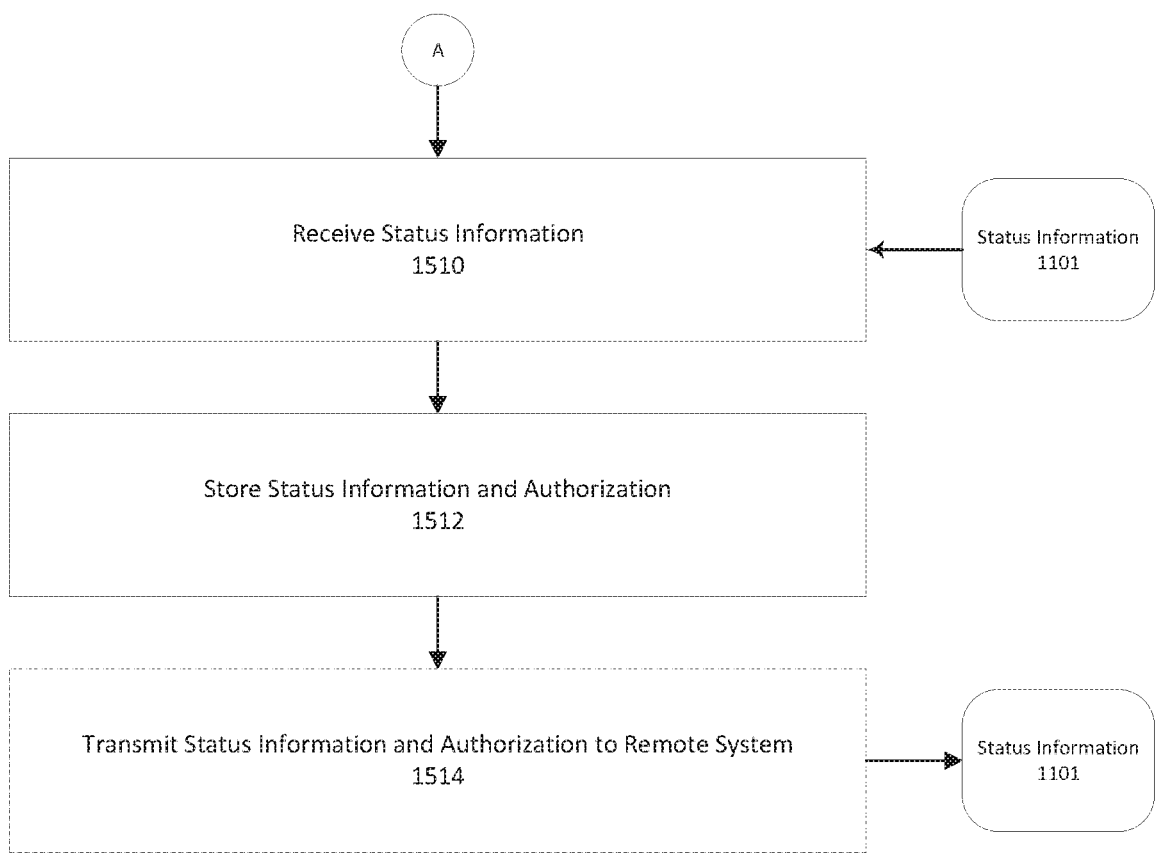
FIG. 15 illustrates an embodiment of sixth logic flow.

FIG. 15 shows a continuation of logic flow 1400. At block 1510, logic flow 1400 is receiving status information indicating the receipt of the signed authorization 1004 by the hardware component 1050. In some embodiments, wherein the actual application of the upgrade only takes place upon a cold boot of the hardware configuration 1050, the status information 1101 may indicate that the signed authorization 1004 was successfully written into memory 120 of hardware component 1050. In other embodiments status information 1101 may indicate that the upgrade to the hardware component 1050 has been successfully completed.

Status information 1101, in some embodiments, may be generated by specialized programming tool and relayed to licensing appliance 1010 via a user equipment 1301. In other embodiments, user equipment 1301 may generate the status information 1101. In yet other embodiments, in which there is a wired interface between licensing appliance 1010 and the hardware component 1050 via, for example, a hardware test platform, shown as reference number 1712 in FIG. 17, status information 1101 may be generated by the hardware test platform 1712.

At block 1512, logic flow 1400 is storing the authorization 1004 and status information 1101. In some embodiments, the authorization 1004 and status information 1101 is stored in the authorization and status storage 1102, as shown in FIG. 11. In some embodiments, authorization and status storage 1102 may be embodied as a database. In other embodiments, any other form of storage for authorizations 1004 and status information 1101 may be utilized, for example, the authorizations 1004 may be stored in the form of a license data blocks 122, in the form of a file, or in any other form well-known to those of skill in the art. Likewise, the status information 1101, maybe stored as received, or in a similar fashion to the authorization 1004. The embodiments are not meant to be limited by the method used to store the authorization and status information.

At block 1514, licensing appliance 1010 may optionally transmit the authorization and status information to a remote system. In some embodiments, the authorization and status information was stored in authorization and status storage 1102 And authorization which was stored in authorization status storage 1102, and retrieved therefrom prior to being sent to the remote system. In some embodiments, the authorization and status information may be periodically transmitted to the remote system in a group of authorizations and status information, while in other embodiments, the authorization and status information may be set individually as they are generated.

In some embodiments, the authorization and status information is sent to the remote system via the Internet, while in other embodiments the status information authorization may be sent via any one of a number of well-known methods, including, for example, via a direct TCP/IP connection. In some embodiments, the remote system may be associated with the manufacture and the authorization and status information may be used to generate invoices for the enhanced capability provided by signed authorization 1004. In other embodiments, licensing appliance 1010 will be required to periodically communicate with a remote system to continue to be authorized to issue license upgrades.

Figure 16:
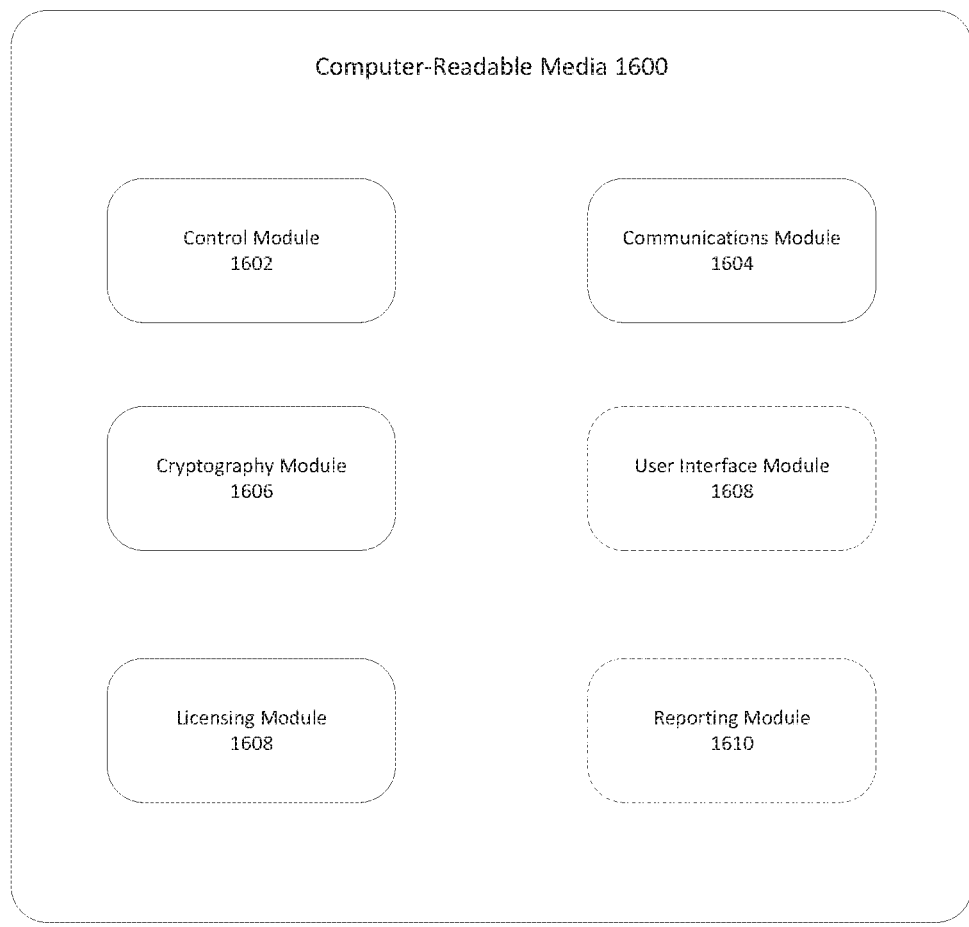
FIG. 16 illustrates an embodiment of a computer-readable medium.

FIG. 16 shows a computer readable media 1600 having stored thereon various software modules for use by licensing appliance 1010. The configuration shown in FIG. 16 is an exemplary embodiment and it will be realized by one of skill in the art that many different arrangements of modules may be used to provide the same functionality, and that the embodiments are not meant to be limited by the configuration shown in FIG. 16.

Control module 1602 is responsible for the overall control of licensing appliance 1010, and the flow of logic for the overall process of providing license upgrades for hardware component 1050. In some embodiments, control module 1602 may assume control upon receiving the request 1101 for the upgrade of a hardware component 1050. In other embodiments, control module may be started manually, via a local user interface, prior to the reception of requests 1101.

Communications module 1604 is responsible for receiving requests for upgrades as well as for communicating signed authorizations 1004 to the hardware component 1050 and receiving status information 1101. In some embodiments, communications module 1604 will handle communications via wireless methods, for example Wi-Fi Bluetooth and NFC or RF. In other embodiments, communications module 1604 will affect communications via the Internet or via a direct TCP/IP connection.

Cryptography module 1606 is responsible for decrypting configuration data and unique ID 1002 which may be in the form of configuration data block 122. Cryptography module 1606 is also responsible for digitally signing and/or encrypting authorization 1003 to create signed authorization 1004 which may in some embodiments take the form of license data block 124. In some embodiments, cryptography module 1606 works in concert with hardware signing module 1014. Cryptography module 1606 may utilize encryption scheme encoded in hardware signing module 1014, or may work independent of hardware signing module 1014 utilizing its own encryption scheme. Cryptography module 1606 may comprise a private encryption key utilized for decrypting configuration data and unique ID 1002 which may be in the form of configuration data block 124, and for digitally signing license data block 122. In other embodiments cryptography module 1606 may utilize the private encryption key encoded in hardware signing module 1014.

User interface module 1608 may be present, in some embodiments, wherein requests 1001 are received directly by licensing appliance 1010. In other embodiments, user interface module 1608 may not be present as requests 1001 may be received via wireless interface from a user equipment 1301. User interface module 1608 may present a user interface via a local display including a visual display and a user input device, for example a keyboard and/or mouse. In other embodiments, user interface module may utilize other methods of displaying the user interface for example the user interface may be displayed as a webpage and accessible via the Internet or may cause a user equipment 1301 two display user interface in a locally installed app.

Licensing module 1608 is responsible for generating the authorizations 1003 for the upgrade of hardware component 1050, as requested in request 1001. Licensing appliance 1010 may be required to be authorized to generate authorizations 1003, and, in some embodiments may be required to communicate periodically with a remote system to continue to be authorized to generate authorizations 1003. The remote system may be a system associated with the manufacture of hardware component 1050 and/or may be associated with an entity able to authorize upgrades to hardware component 1050. Licensing module 1608 may generate licenses which are specific to the manufacturer of hardware component 1050. It would be realized by one of skill in the art that the embodiments are not meant to be limited by the contents of the licensing module, but that any contents able to be decoded and utilized by executable code 112 would be acceptable.

Licensing module 1608 may generate authorizations 1003 which contain metadata sufficient to affect the upgrade of hardware component 1050. In some embodiments, licensing module 1608 may only generate authorizations 1003 for specific hardware components 1050. Specific hardware components 1050, in one embodiment, may be identified by their ability to decode and validate signed authorization 1004 utilizing public key 206, as the signed authorization 1004 will been signed utilizing a private encryption key specific to a particular licensing apparatus 1010. In other embodiments, specific hardware components may be identified by their unique ID 116 which may be included by licensing module 1608 in authorization 1003.

Reporting module 1610, in some embodiments, may optionally transmit the authorization and status information to a remote system. In some embodiments, as previously discussed reporting module 1610 may report all instances of generated authorizations 1003 and their respective status information 1101 periodically, as a group, after retrieving them from application and status storage 1102. In another embodiment, reporting module 1610 may report generated authorizations 1003 and respective status information 1101 as they are generated. In some embodiments, the remote system may be associated with the manufacture of hardware component 1050 and may utilize the information sent by reporting module 1610 for billing and invoicing purposes, to receive payment for the issuing of license upgrades.

Figure 17:
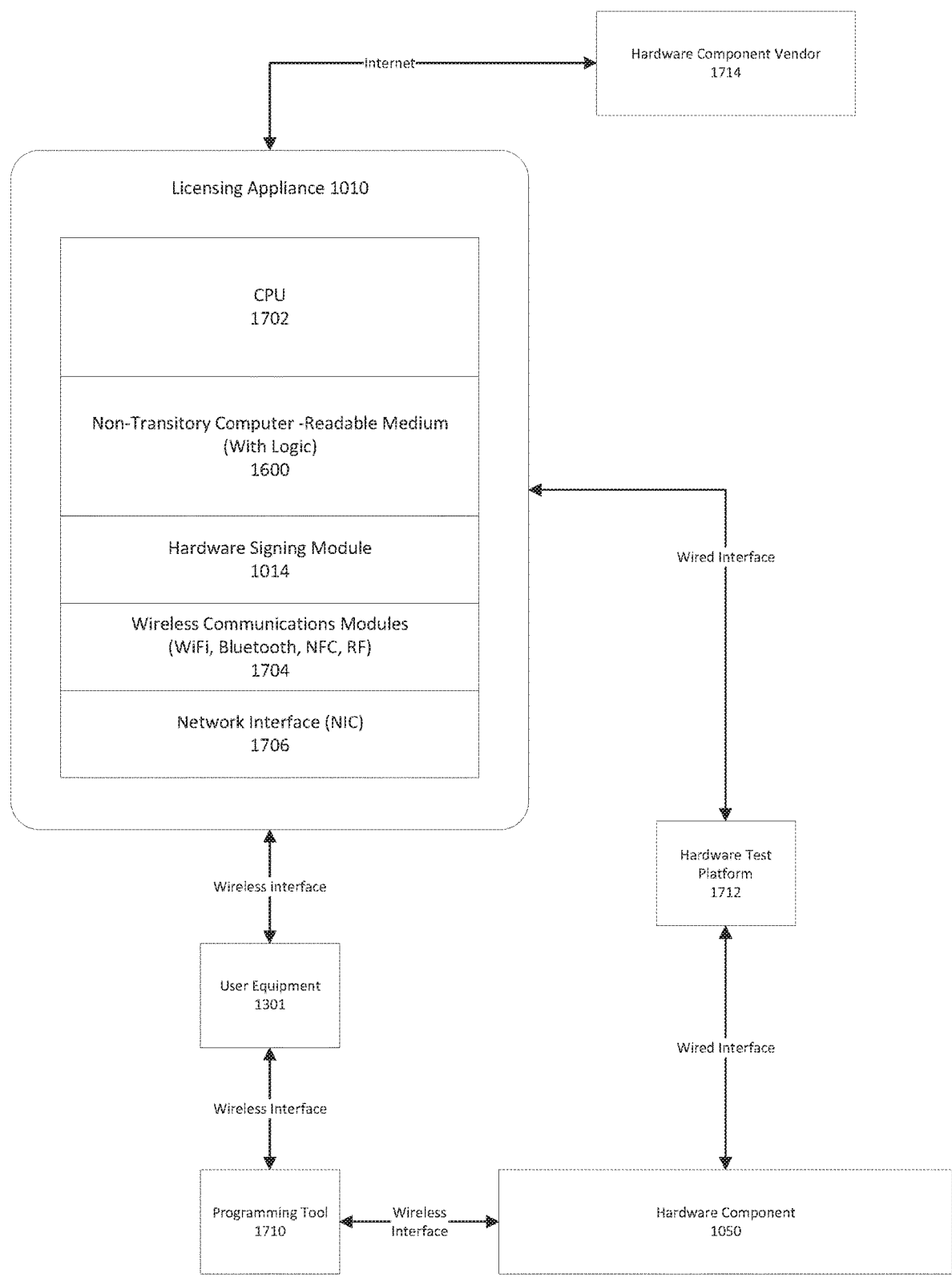
FIG. 17 illustrates a fourth embodiment of a licensing apparatus.

FIG. 17 shows an overall system diagram including licensing appliance 1010. Licensing appliance 1010 comprises CPU or processor 1702, suitable for executing logic contained in non-transitory computer readable medium 1600. The logic contained in non-transitory computer readable medium 1600 is, in one embodiment, responsible for receiving a request for and generating licenses for the upgrade of hardware components 1050, as discussed herein. Hardware signing module 1014 contains an encryption algorithm and private key used for signing authorizations for upgrades generated by the logic stored in non-transitory computer readable medium 1600. In other embodiments, the encryption algorithm and private key used for signing authorizations may be contained in non-transitory computer readable medium 1600.

Wireless communications modules 1704 is responsible for all wireless communication with licensing appliance 1010, including, for example, the receiving of requests 1001, the transmitting of signed authorizations 1004 to hardware component 1050 and the receiving of status information 1101. Network interface 1706 is responsible for communications via the Internet, which may be used to communicate with hardware component vendor 1714 to report authorizations generated for specific hardware components 1054, for, in some embodiments, invoicing purposes. Network interface 1706 pay also be utilized in the case where the user interface is generated as a website available via the Internet, or in cases where communications with other systems occur via a direct TCP/IP connection FIG. 17 also shows both methods for communication between the licensing appliance 1010 and hardware component 1050. In one embodiment, user equipment 1301 may receive licensing information from licensing appliance 1010. User equipment 1301 may also interface with programming tool 1710, which may be specially configured to communicate with the memory 120 stored in hardware component 1050 via a wireless interface, which may be for example, RF interface 130. In such cases hardware component 1050 will be equipped with RF-enabled NVRAM memory. Programming tool 1710 may be specifically configured in one embodiment to communicate with memory 120 via RF interface 130 as shown in FIG. 1. In some embodiments memory 120 in hardware component 1050 may not be powered when programming tool 1710 is reading data from or writing data to memory 120, but may receive power directly from RF interface 130. User equipment 1301 may communicate with programming tool 1710 via a wired or wireless interface, for example, Bluetooth Wi-Fi or NFC.

In another embodiment, licensing appliance 1010 may communicate with hardware component 1050 via a wired interface through a hardware test platform 1712. In such cases, semiconductor package 100 have power.

The following include non-limiting examples according to some embodiments:

Example 1 is an apparatus comprising a semiconductor package comprising processor circuitry having executable code embedded therein, the processor circuitry configured with one or more operational capabilities and a unique identifier to identify the processor circuitry; and memory, in communication with the processor circuitry, the memory comprising a configuration data block containing at least the unique identifier identifying the processor circuitry, and a current configuration of the processor circuitry, and a license data block, containing a license for a set of configuration parameters for the one or more operational capabilities for the processor circuitry, the license signed with the unique identifier.

Example 2 is the apparatus of example [0090] wherein the configuration data block includes a public encryption key associated with the semiconductor package.

Example 3 is the apparatus of example [0092] wherein the configuration data block is signed with the unique identifier and is encrypted.

Example 4 is the apparatus of example [0090] further comprising means for encrypting the configuration data block.

Example 5 is the apparatus of example [0090] wherein the executable code contains instructions to read the license data block, validate the license data block by verifying that the identifier used to sign the license data block matches the unique identifier of the processor circuitry and override the configured operational capabilities of the processor circuitry with the set of configuration parameters specified in the license data block.

Example 6 is the apparatus of example [0095] wherein the license data block is signed with a private key and further wherein the semiconductor package contains a public encryption key and the executable code contains further instructions to decrypt the license data block using the public encryption key.

Example 7 is the apparatus of example [0095] further comprising means for decrypting the license data block.

Example 8 is the apparatus of example [0096] wherein the memory is wireless capable and further wherein the configuration data block is read from the memory via a wireless connection and further wherein the license data block is stored into the memory via a wireless connection.

Example 9 is the apparatus of example 6 further comprising means for wirelessly reading the configuration data block from the memory and writing the license data block to the memory.

Example 10 is the apparatus of example [0095] wherein the configured operational capabilities are hardware encoded into the processor circuitry via a fusing process and further wherein the set of configuration parameters are applied by overriding various fuse locations within a fuse controller and modifying certain configuration register banks.

Example 11 is the apparatus of example [0095] further comprising means for overriding the configured operational capabilities of the processor.

Example 12 is a system comprising an apparatus according to any of examples [0090] to [00100], wherein the memory is radio frequency (RF)-enabled NVRAM.

Example 13 is the system of example [00102], further comprising an RF antenna.

Example 14 is the system of example [00102] further comprising means for reading data from and writing data to the memory.

Example 15 is a system comprising an apparatus according to any of examples [0090] to [00100] wherein the memory can be read from or written to through a wired connection to the processor circuitry.

Example 16 is a method comprising retrieving a license data block from a memory, the license data block containing a signed license allowing a set of configuration parameters for one or more operational capabilities to be applied to processor circuitry in communication with the memory, validating the license data block; and applying the set of configuration parameters specified in the license data block to the processor circuitry.

Example 17 is the method of example [00106] wherein the license data block is signed with a private key where the method further comprises verifying the signature with a public key, the public key being encoded into the processor circuitry.

Example 18 is the method of example [00107], where the method further comprises extracting an identifier from the license data block and verifying that the identifier matches a unique identifier encoded into the processor circuitry.

Example 19 is the method of example [00108], further comprising extracting the license from the verified license data block and applying the set of configuration parameters to the processor circuitry.

Example 20 is the method of example [00107] wherein the license data block is signed and verified using the elliptical curve digital signature algorithm.

Example 21 is the method of example [00109] wherein applying the set of configuration parameters further comprises overriding fuse locations in a fuse controller located in the processor circuitry and modifying configuration register banks located in the processor circuitry.

Example 22 is the method of example [00108] wherein the method is embodied in executable code encoded into the processor circuitry.

Example 23 is the method of example [00112] wherein the executable code is executed on a cold boot of the processor circuitry.

Example 24 is the method of any of examples [00106] to [00113] wherein the memory is radio frequency (RF)-enabled NVRAM.

Example 25 is a system comprising processor circuitry having executable code embedded therein, the executable code containing instructions to execute the method according to any of examples [00106] to [00113] and memory, in communication with the processor circuitry.

Example 26 is the system of example [00115] further comprising an RF antenna.

Example 27 is the system of example [00115] further comprising means for reading data from and writing data to the memory.

Example 28 is the system of example [00117] wherein the means for reading data from and writing data to the memory is wireless.

Example 29 is a non-transitory computer-readable storage medium containing microcode that when executed, causes processor circuitry to retrieve a license data block from a memory, the license data block containing a signed license for a set of configuration parameters for one or more operational capabilities for the processor circuitry in communication with the memory, validate the license data block and apply the set of configuration parameters specified in the license data block to the processor circuitry.

Example 30 is the non-transitory computer-readable storage medium of example [00119] wherein the license data block is signed with a private key, further comprising executable code that when executed, cause processor circuitry to verify the signature with a public key, the public key being encoded into the processor circuitry.

Example 31 is the non-transitory computer-readable storage medium of example [00120], further comprising executable code that when executed, cause processor circuitry to extract an identifier from the license data block and verify that the identifier matches a unique identifier encoded into the processor circuitry.

Example 32 is the non-transitory computer-readable storage medium of example [00120] further comprising means for verifying the license data block.

Example 33 is the non-transitory computer-readable storage medium of example [00121], further comprising executable code that when executed, cause processor circuitry to extract the license from the verified license data block and apply the set of configuration parameters to the processor circuitry.

Example 34 is the non-transitory computer-readable storage medium of example [00121] further comprising means for updating the set of configuration parameters in the processor circuitry.

Example 35 is the non-transitory computer-readable storage medium of example [00123] wherein the executable code is executed on a cold boot of the processor circuitry.

Example 36 is the non-transitory computer-readable storage medium according to any of examples [00119] to [00125] wherein the processor circuitry and memory are combined into a single semiconductor package.

Example 37 is a system comprising the non-transitory computer-readable storage medium according to any of examples [00119] to [00126] wherein the memory is radio frequency (RF)-enabled NVRAM.

Example 38 is the system of example [00127], further comprising an RF antenna.

Example 39 is a system comprising the non-transitory computer-readable storage medium according to any of examples [00119] to [00126] further comprising means for writing data to and reading data from the memory.

Example 40 is a system, comprising the non-transitory computer-readable storage medium according to any of examples [00119] to [00126] wherein the memory can be read from or written to through a wired connection to the processor circuitry.

Example 41 is an apparatus comprising memory, containing logic for execution by a processor and a hardware signing module containing a private encryption key, wherein the logic is configured to receive a request to modify one or more configuration parameters of a hardware component, receive configuration data indicating the current configuration parameters of the hardware component and a unique identifier identifying the hardware component, generate an authorization to modify the one or more of the configuration parameters, the authorization containing the unique identifier and the authorization being signed by the private key and communicate the authorization to the hardware component.

Example 42 is the apparatus of example [00131] wherein the logic is further configured to receive status information indicating the receipt of the authorization by the hardware component and store the authorization and status information for transmission to a remote system.

Example 43 is the apparatus of example [00131] further comprising user interface logic configured to generate a user interface.

Example 44 is the apparatus of example [00131] further comprising means for generating a user interface.

Example 45 is the apparatus of examples [00133] or [00134] wherein the request to modify one or more configuration parameters of a hardware component is received through the user interface.

Example 46 is the apparatus of example [00135] wherein the configuration data is received through a wired connection and further wherein the authorization is communicated to the hardware component via the wired connection.

Example 47 is the apparatus of example [00131] wherein the request to modify one or more configuration parameters of a hardware component is received from a mobile device.

Example 48 is the apparatus of example [00136] wherein the configuration data is received from the hardware component through the mobile device and further wherein the authorization is communicated to the hardware component through the mobile device.

Example 49 is the apparatus of example [00131] further comprising means for receiving the configuration data from the hardware component and means for communicating the authorization to the hardware component.

Example 50 is the apparatus of example [00131] wherein the configuration data is received in encrypted form, the logic being further configured to decrypt the configuration data.

Example 51 is the apparatus of example [00131] wherein the configuration data is received in encrypted form further comprising means for decrypting the configuration data.

Example 52 is the apparatus of any of examples [00131] to [00141] wherein the hardware component is a semiconductor package containing a processor and a memory in communication with the processor.

Example 53 is a system comprising the apparatus of examples [00137] or [00138] further comprising a wireless interface, the wireless interface being used to communicate with the mobile device.

Example 54 is a system comprising the apparatus of examples [00137] or [00138] further comprising means for communicating with the mobile device.

Example 55 is the system of example [00143] wherein the mobile device generates a user interface through which the request to modify one or more configuration parameters is received.

Example 56 is the system of example [00143] wherein the wireless interface is selected from a group consisting of RF, WiFi, Bluetooth and NFC.

Example 57 is a method comprising receiving a request to modify one or more configuration parameters of a hardware component, receiving configuration data indicating the current configuration parameters of the hardware component and a unique identifier identifying the hardware component, generating an authorization to modify the one or more of the configuration parameters, the authorization containing the unique identifier and the authorization being signed by the private key and communicating the authorization to the hardware component.

Example 58 is the method of example [00147] further comprising receiving status information indicating the receipt of the authorization by the hardware component, storing the authorization and status information and transmitting the authorization and status information to a remote system.

Example 59 is the method of example [00147] wherein the request to modify one or more configuration parameters of a hardware component is received through a user interface.

Example 60 is the method of example [00149] wherein the configuration data is received through a wired connection and further wherein the authorization is communicated to the hardware component via the wired connection.

Example 61 is the method of example [00147] wherein the request to modify one or more configuration parameters of a hardware component is received from a mobile device.

Example 62 is the method of example [00151] wherein the configuration data is received through the mobile device and further wherein the authorization is communicated to the hardware component through the mobile device.

Example 63 is the method of example [00147] wherein the configuration data is encrypted, the method further comprising decrypting the configuration data prior to generating the authorization.

Example 64 is the apparatus of any of examples [00147] to [00153] wherein the hardware component is a semiconductor package containing a processor and a memory in communication with the processor.

Example 65 is a system comprising a processor, memory, containing logic for execution by the processor, the logic implementing the method according to any of examples [00147] to [00154] and a hardware signing module containing a private encryption key.

Example 66 is the system of example [00155] further comprising a wireless interface, the wireless interface being used to communicate with the mobile device.

Example 67 is the system of example [00155] further comprising means for communicating with the mobile device.

Example 68 is the system of example [00156] wherein the wireless interface is selected from a group consisting of RF, WiFi, Bluetooth and NFC.

Example 69 is the system of example [00156] wherein the mobile device generates a user interface through which the request to modify one or more configuration parameters is received.

Example 70 is the system of example [00156] further comprising means for receiving the request to modify one or more configuration parameters.

Example 71 is a non-transitory machine-readable medium comprising plurality of instructions that, when executed by a processor, cause the processor to receive a request to modify one or more configuration parameters of a hardware component, receive configuration data indicating the current configuration parameters of the hardware component and a unique identifier identifying the hardware component, generate an authorization to modify the one or more of the configuration parameters, the authorization containing the unique identifier and the authorization being signed by the private key and communicate the authorization to the hardware component.

Example 72 is the non-transitory machine-readable medium of example [00161] further comprising instructions that, when executed by a processor, cause the processor to receive status information indicating the receipt of the authorization by the hardware component, store the authorization and status information and transmit the authorization and status information to a remote system.

Example 73 is the non-transitory machine-readable medium of example [00161] wherein the configuration data is encrypted, further comprising instructions that, when executed by a processor, cause the processor to decrypt the configuration data.

Example 74 is the non-transitory machine-readable medium of example [00161] wherein the configuration data is encrypted, further comprising means for decrypting the configuration data.

Example 75 is the non-transitory machine-readable medium of any of examples [00161] to [00163] wherein the hardware component is a semiconductor package containing a processor and a memory in communication with the processor.

Example 76 is the non-transitory machine-readable medium of any of examples [00161] to [00165] wherein the instructions further cause the processor to generate a user interface.

Example 77 is the non-transitory machine-readable medium of any of examples [00161] to [00165] further comprising means for generating a user interface.

Example 78 is the non-transitory machine-readable medium of examples [00166] or [00167] wherein the request to modify one or more configuration parameters of a hardware component is received through the user interface.

Example 79 is the non-transitory machine-readable medium of any of examples [00161] to [00168] wherein the authorization is communicated to the hardware component via a wired connection.

Example 80 is the non-transitory machine-readable medium of any of examples [00161] to [00168] further comprising means for communicating the authorization to the hardware component.

Example 81 is the non-transitory machine-readable medium of any of examples [00161] to [00165] wherein the request to modify one or more configuration parameters of a hardware component is received from a mobile device and further wherein the authorization is communicated to the hardware component through the mobile device.

Example 82 is the non-transitory machine-readable medium of any of examples [00161] to [00165] further comprising means for receiving the request to modify one or more configuration parameters from a hardware component and means for communicating the authorization to the hardware component.

Example 83 is a system comprising the non-transitory machine-readable medium of example [00171] further comprising a wireless interface, the wireless interface being used to communicate with the mobile device.

Example 84 is the system of example [00173] wherein the mobile device generates a user interface through which the request to modify one or more configuration parameters is received.

Example 85 is the system of any of examples [00173] or [00174] wherein the wireless interface is selected from a group consisting of RF, WiFi, Bluetooth and NFC. It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus comprising:
a semiconductor package comprising:
processor circuitry having executable code embedded therein, the processor circuitry configured with one or more operational capabilities and a unique identifier to identify the processor circuitry; and
memory, in communication with the processor circuitry, the memory comprising:
a configuration data block containing at least the unique identifier identifying the processor circuitry, and a current configuration of the one or more operational capabilities of the processor circuitry, wherein the current configuration specifies a first number of computing threads to be executed by a processor core of the processor circuitry; and
a license data block, containing a license for a set of configuration parameters for the one or more operational capabilities of the processor circuitry, the license signed with the unique identifier, the set of configuration parameters to enable or disable each respective operational capability of the one or more operational capabilities of the processor circuitry, wherein the set of configuration parameters specifies a second number of computing threads to be executed by the processor core,
wherein the executable code is to upgrade the processor core to execute the second number of computing threads by overriding the current configuration with the set of configuration parameters.

2. The apparatus of claim 1, wherein the configuration data block includes a public encryption key associated with the semiconductor package.

3. The apparatus of claim 2, wherein the configuration data block is signed with the unique identifier and is encrypted.

4. The apparatus of claim 1, wherein the executable code contains instructions to:
read the license data block;
validate the license data block by verifying that the identifier used to sign the license data block matches the unique identifier of the processor circuitry; and
override the current configuration of the one or more operational capabilities of the processor circuitry with the set of configuration parameters specified in the license data block to upgrade the processor core to execute the second number of computing threads.

5. The apparatus of claim 4, wherein the license data block is signed with a private key and includes the unique ID of the processor circuitry and further wherein the semiconductor package contains a public encryption key and the code contains further instructions to decrypt the license data block using the public encryption key.

6. The apparatus of claim 1, wherein the memory is wireless capable and further wherein the configuration data block is read from the memory via a wireless connection and further wherein the license data block is stored into the memory via a wireless connection.

7. The apparatus of claim 1, wherein the current configuration specifies to disable a first operational capability of the one or more operational capabilities, wherein the configuration parameters specify to enable to first operational capability.

8. The apparatus of claim 7, wherein the executable code contains instructions to:
modify, based on the configuration parameters, one or more configuration register banks of the processor circuitry to enable the first operational capability.

9. The apparatus of claim 1, wherein the first number of computing threads is different than the second number of computing threads, wherein the one or more operational capabilities comprise a plurality of processor cores of the processor circuitry, a cache of the processor circuitry, or an operating frequency of the processor circuitry, wherein the plurality of processor cores include the processor core.

10. A method comprising:
retrieving a license data block from a memory, the license data block containing a signed license allowing a set of configuration parameters for one or more operational capabilities to be applied to processor circuitry in communication with the memory, the one or more operational capabilities of the processor circuitry configured according to a current configuration, wherein the current configuration specifies a first number of computing threads to be executed by a processor core of the processor circuitry, wherein the configuration parameters specify a second number of computing threads to be executed by the processor core;
validating the license data block; and
applying the set of configuration parameters specified in the license data block to the processor circuitry to override the current configuration to enable or disable each respective operational capability of the one or more operational capabilities and upgrade the processor core to execute the second number of computing threads.

11. The method of claim 10, wherein the license data block is signed by a signature generated with a private key, the method further comprising:
verifying the signature with a public key, the public key being encoded into the processor circuitry.

12. The method of claim 11, further comprising:
extracting an identifier from the license data block; and
verifying that the identifier matches a unique identifier encoded into the processor circuitry.

13. The method of claim 12, wherein the first number of computing threads is different than the second number of computing threads, the method further comprising:
extracting the license from the verified license data block.

14. The method of claim 10, wherein the method is embodied in executable code encoded into the processor circuitry.

15. The method of claim 14, wherein the executable code is executed on a cold boot of the processor circuitry.

16. An apparatus, comprising:
memory, containing logic for execution by a first processor; and
a hardware signing module containing a private encryption key;
wherein the logic is configured to:
receive a request to modify one or more operational capabilities of a second processor from a current configuration to a modified configuration, wherein the current configuration specifies a first number of computing threads to be executed by a processor core of the second processor, wherein the modified configuration specifies a second number of computing threads to be executed by the processor core;
receive configuration data indicating the current configuration of the one or more operational capabilities of the second processor and a unique identifier identifying the second processor;
generate an authorization to override the current configuration to enable or disable each respective operational capability of the one or more operational capabilities of the second processor as specified by the modified configuration, the authorization containing the unique identifier and the authorization being signed by the private key; and
communicate the authorization to the second processor to upgrade the processor core to execute the second number of computing threads.

17. The apparatus of claim 16, wherein the logic is further configured to:
receive status information indicating the receipt of the authorization by the second processor; and
store the authorization and status information for transmission to a remote system.

18. The apparatus of claim 16, wherein the configuration data is received through a wired connection and further wherein the authorization is communicated to the second processor via the wired connection.

19. The apparatus of claim 16, wherein the configuration data is received through a wireless connection and further wherein the authorization is communicated to the second processor via the wireless connection.

20. The apparatus of claim 19, wherein the configuration data is received from the second processor through a mobile device and further wherein the authorization is communicated to the second processor through the mobile device.

* * * * *